(12) United States Patent
Sato et al.

(10) Patent No.: US 7,428,207 B2
(45) Date of Patent: Sep. 23, 2008

(54) ABERRATION CORRECTING DEVICE AND OPTICAL RECORDING MEDIUM REPRODUCING APPARATUS

(75) Inventors: Makoto Sato, Saitama (JP); Masakazu Ogasawara, Saitama (JP)

(73) Assignee: Pioneer Corporation, Tokyo (JP)

( * ) Notice: Subject to any disclaimer, the term of this patent is extended or adjusted under 35 U.S.C. 154(b) by 508 days.

(21) Appl. No.: 10/916,452

(22) Filed: Aug. 12, 2004

(65) Prior Publication Data
US 2005/0047311 A1 Mar. 3, 2005

(30) Foreign Application Priority Data
Aug. 28, 2003 (JP) ............. P.2003-209416

(51) Int. Cl.
*G11B 7/00* (2006.01)
(52) U.S. Cl. ............. 369/112.02; 369/44.23; 369/112.08
(58) Field of Classification Search ......... None
See application file for complete search history.

(56) References Cited

U.S. PATENT DOCUMENTS

| | | | | |
|---|---|---|---|---|
| 5,416,757 A | * | 5/1995 | Luecke et al. ............. | 369/44.23 |
| 6,052,237 A | | 4/2000 | Opheij et al. | |
| 6,724,710 B2 | * | 4/2004 | Chung et al. ............. | 369/112.02 |
| 2002/0150016 A1 | * | 10/2002 | Yasuda et al. ............. | 369/112.02 |
| 2003/0086353 A1 | | 5/2003 | Chung et al. | |
| 2004/0223442 A1 | * | 11/2004 | Koike et al. ............. | 369/112.08 |

FOREIGN PATENT DOCUMENTS

| | | |
|---|---|---|
| CN | 1181833 A | 5/1998 |
| EP | 0 881 634 A1 | 12/1998 |
| EP | 1 136 993 A1 | 9/2001 |
| EP | 1 168 055 A2 | 1/2002 |
| JP | 9-128785 A | 5/1997 |

* cited by examiner

*Primary Examiner*—Joseph Feild
*Assistant Examiner*—Peter Vincent Agustin
(74) *Attorney, Agent, or Firm*—Sughrue Mion, PLLC

(57) ABSTRACT

A disk reproducing apparatus for reproducing a disk that is any one of three kinds of disks, BD, DVD and CD, employing a BD objective lens, correct only aberration occurring inside the effective diameter of DVD, and leaves aberration outside the effective diameter, when reproducing DVD. Likewise, the disk reproducing apparatus corrects only aberration occurring inside the effective diameter of CD, and leaves aberration outside the effective diameter, when reproducing CD.

10 Claims, 41 Drawing Sheets

|  | WAVELENGTH [nm] | NA | COVER LAYER THICKNESS [mm] |
|---|---|---|---|
| BD | 405 | 0.85 | 0.1 |
| DVD | 650 | 0.6 | 0.6 |
| CD | 780 | 0.45 | 1.2 |

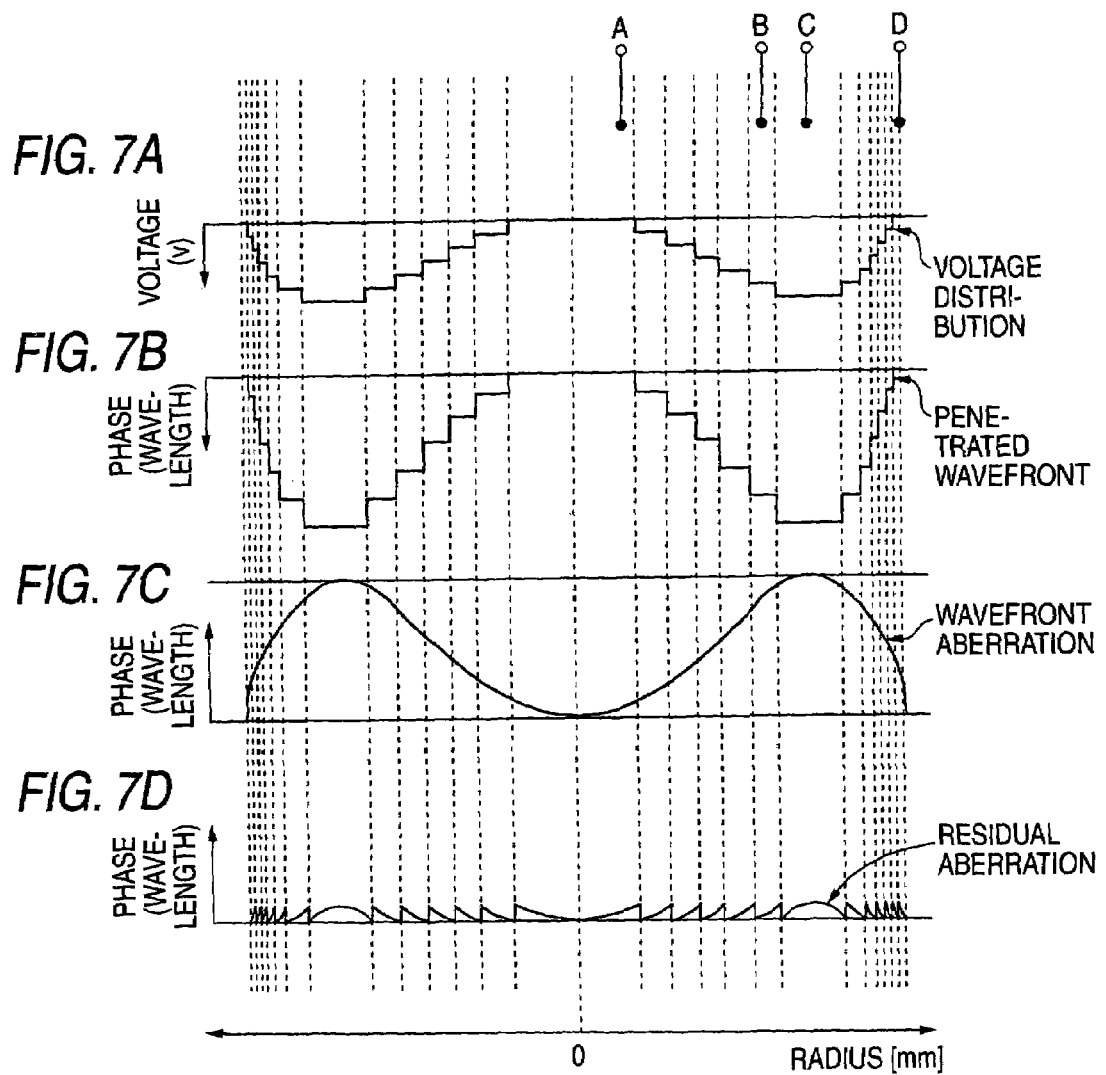

|  | WAVELENGTH [nm] | NA | COVER LAYER THICKNESS [mm] |
|---|---|---|---|
| AOD | 405 | 0.65 | 0.6 |
| DVD | 650 | 0.65 | 0.6 |
| CD | 780 | 0.45 | 1.2 |

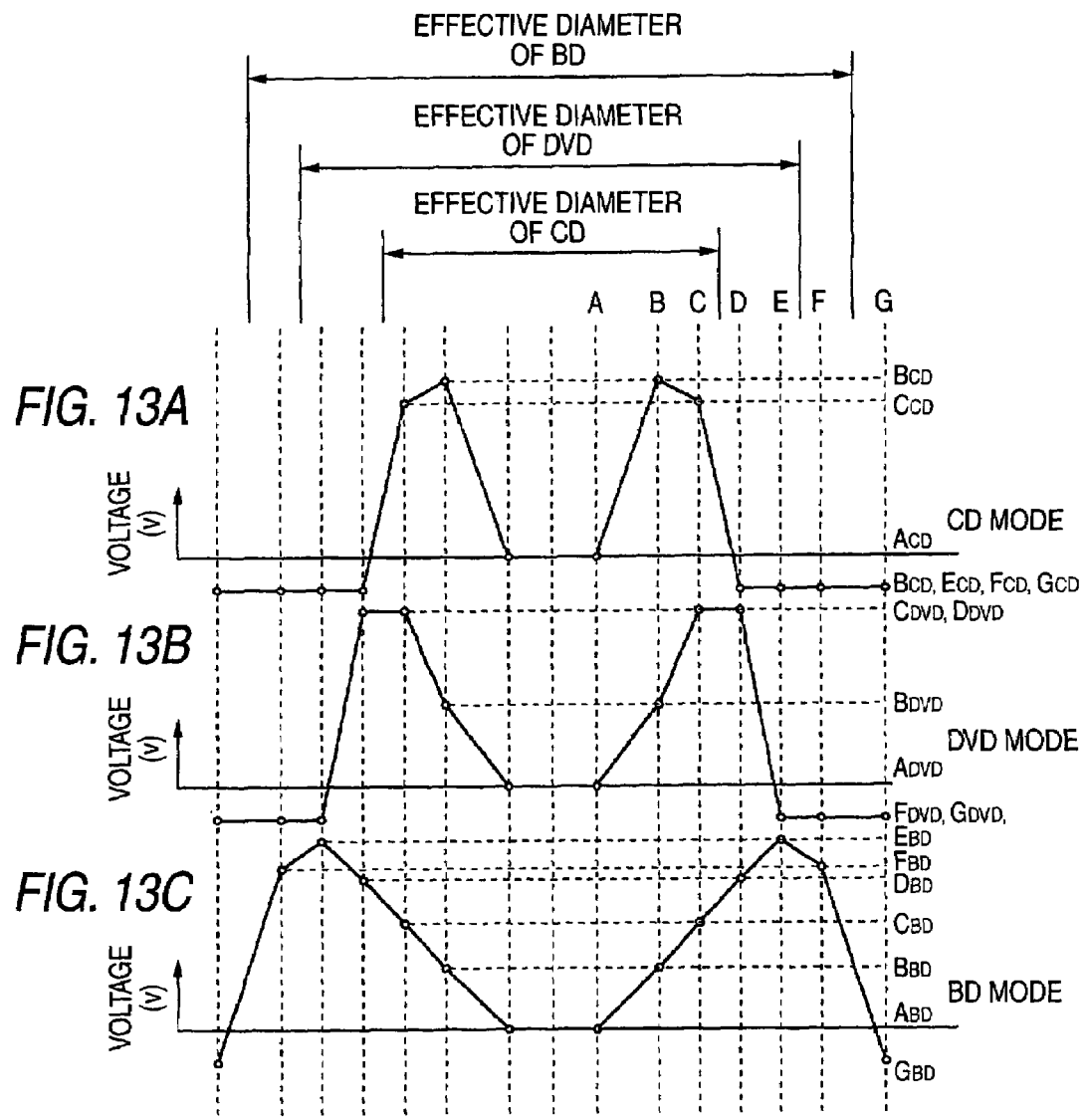

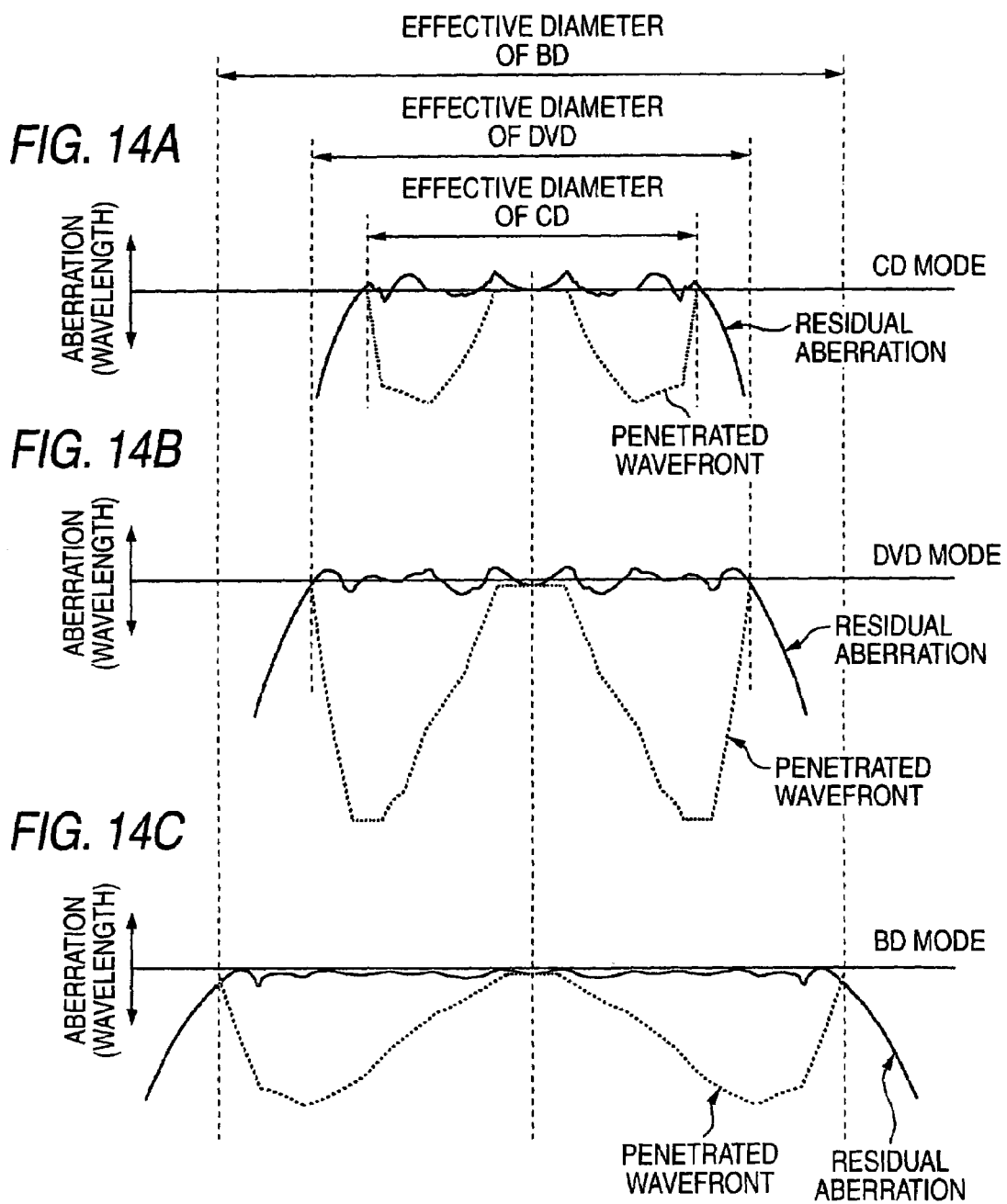

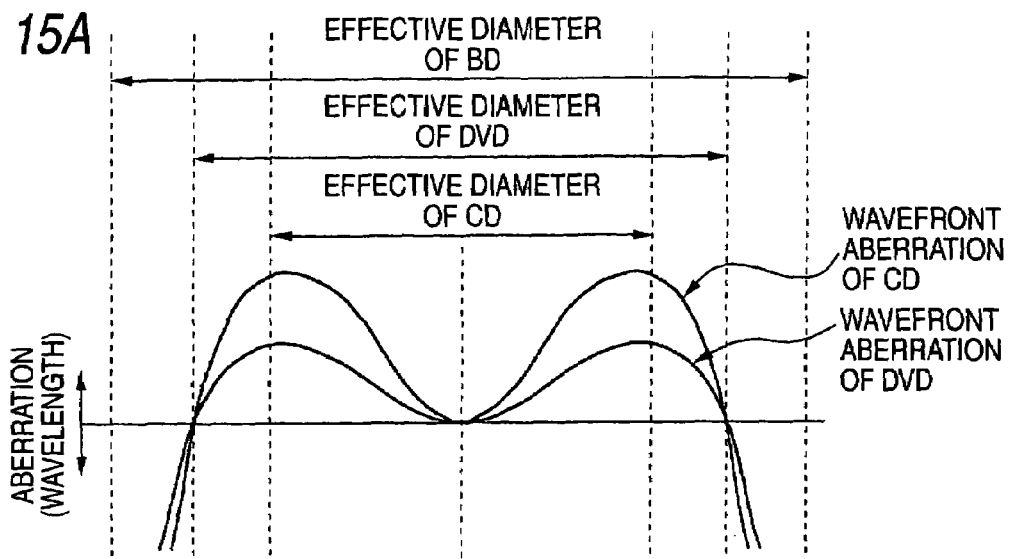
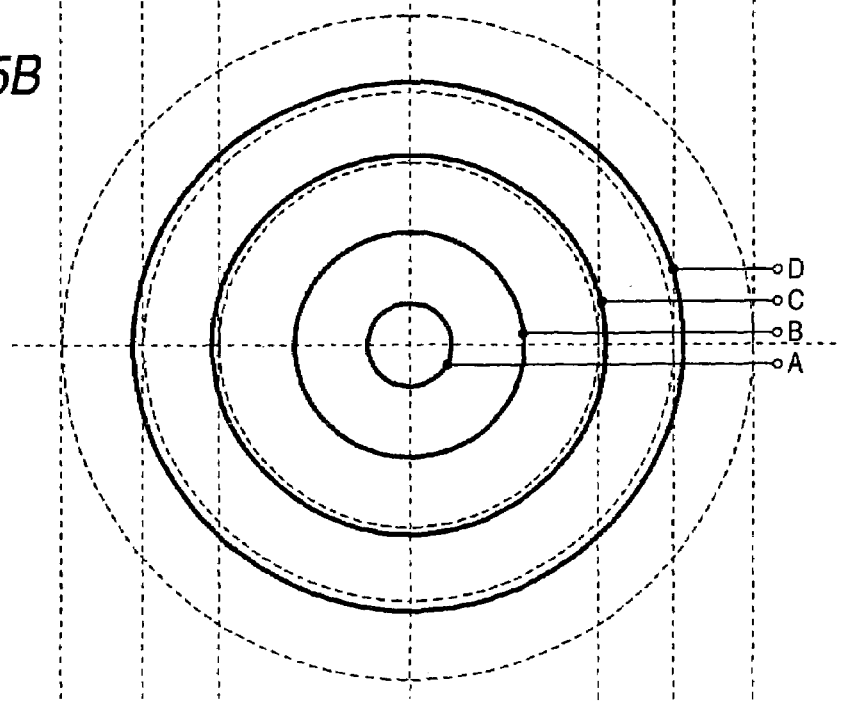

ABERRATION CORRECTING DEVICE AND OPTICAL RECORDING MEDIUM REPRODUCING APPARATUS

BACKGROUND OF THE INVENTION

1. Field of the Invention

The present invention relates to an aberration correcting device and an optical recording medium reproducing apparatus.

2. Description of the Related Art

Conventionally, in a technical field of an optical pickup for reading the recorded information of an optical disk, aberration correction employing a liquid crystal panel is conducted to read a plurality of kinds of optical disks with one objective lens. For example, in JP-A-9-128785, to reproduce both DVD and CD with one objective lens, an optical pickup that corrects an aberration occurring in the objective lens by controlling the applied voltage of the liquid crystal panel in accordance with a disk thickness has been disclosed.

JP-A-9-128785 is referred to as a related art.

With the conventional technique as described above, although the aberration occurring in the objective lens is corrected, the numerical aperture (NA) of each disk is not directly dealt with. It results in a problem that aperture restriction has to be made separately from the aberration correction by shielding the light through a liquid crystal shutter to deal with the numerical aperture.

Therefore, one of the problems to be solved by the invention is that "when an objective lens having a different aperture diameter is employed for a certain disk, it is required to make the aperture restriction separately from the aberration correction".

SUMMARY OF THE INVENTION

The invention provides an aberration correcting device which corrects an aberration occurring in recording or reproducing a predetermined optical recording medium with an objective lens having a second effective diameter different from a first effective diameter of another objective lens used for the predetermined optical recording medium, having: a correction portion for correcting only an aberration occurring inside the first effective diameter among aberrations inside and outside the first effective diameter.

The invention provides an aberration correcting device which corrects an aberration occurring when one objective lens is employed for a plurality of optical recording media at least one of recording density and thickness of a cover layer of which is different from each other, having: a liquid crystal element disposed between the objective lens and a light source and controlled a refractive index thereof to be varied in accordance with an applied voltage; and a voltage applying portion for applying the voltage to the liquid crystal element so that a wavefront of light penetrated through the liquid crystal element forms a penetrated wavefront having a predetermined phase distribution, wherein the voltage applying portion applies voltage so that a penetrated wavefront having a phase distribution for correcting only an aberration occurring in an area inside an effective diameter in recording or reproducing the optical recording medium is formed.

The invention provides an aberration correcting device which corrects an aberration occurring when an objective lens exclusively used for a first optical recording medium is employed for a second optical recording medium having an effective diameter in recording or reproducing the optical recording medium smaller than an effective diameter of the first optical recording medium, and for a third optical recording medium having an effective diameter smaller than an effective diameter of the second optical recording medium, having: a liquid crystal element disposed between the objective lens and a light source and controlled a refractive index thereof to be varied in accordance with an applied voltage; and a voltage applying portion for applying the voltage to the liquid crystal element so that a wavefront of light penetrated through the liquid crystal element forms a penetrated wavefront having a predetermined phase distribution, wherein the voltage applying portion applies voltage so that a penetrated wavefront having a phase distribution for correcting only an aberration occurring in an area inside a first effective diameter in recording or reproducing the second optical recording medium is formed when the objective lens is employed for the second optical recording medium, and applies voltage so that a penetrated wavefront having a phase distribution for correcting only an aberration occurring in an area inside a second effective diameter in recording or reproducing the third optical recording medium is formed when the objective lens is employed for the third optical recording medium.

The invention provides an optical recording medium reproducing apparatus having an aberration correcting device, wherein the aberration correcting device corrects an aberration to reproduce information recorded in an optical recording media.

The invention provides an optical recording medium reproducing apparatus which corrects an aberration occurring in recording or reproducing a predetermined optical recording medium with an objective lens having a second effective diameter different from a first effective diameter of another objective lens used for the predetermined optical recording medium, and reproduces information recorded in the predetermined optical recording media, having: a correction portion for correcting only an aberration occurring inside the first effective diameter among aberrations inside and outside the first effective diameter.

The invention provides an optical recording medium reproducing apparatus which corrects an aberration occurring when one objective lens is employed for the plurality of optical recording media at least one of recording density and thickness of a cover layer of which is different from each other, and reproduces information recorded in each optical recording media, having: a liquid crystal element disposed between the objective lens and a light source and controlled a refractive index thereof to be varied in accordance with an applied voltage; and a voltage applying portion for applying the voltage to the liquid crystal element so that a wavefront of light penetrated through the liquid crystal element forms a penetrated wavefront having a predetermined phase distribution, wherein the voltage applying portion applies voltage so that a penetrated wavefront having a phase distribution for correcting only an aberration occurring in an area inside an effective diameter in recording or reproducing the optical recording medium is formed.

The invention provides an optical recording medium reproducing device which corrects an aberration occurring when an objective lens exclusively used for a first optical recording medium is employed for a second optical recording medium having an effective diameter in recording or reproducing the optical recording medium smaller than an effective diameter of the first optical recording medium, and for a third optical recording medium having an effective diameter smaller than an effective diameter of the second optical recording medium, and reproduces information recorded in each optical recording media, having: a liquid crystal element disposed between the objective lens and a light source and controlled a refractive index thereof to be varied in accordance with an applied voltage; and a voltage applying portion for applying voltage to the liquid crystal element so that a wavefront of light penetrated through the liquid crystal element forms a penetrated wavefront having a predetermined phase distribution, wherein the voltage applying portion applies voltage so that a penetrated wavefront having a phase distribution for correcting only an aberration occurring in an area inside a first effective diameter in recording or reproducing the second optical recording medium is formed when the objective lens is employed for the second optical recording medium, and applies voltage so that a penetrated wavefront having a phase distribution for correcting only an aberration occurring in an area inside a second effective diameter in recording or reproducing the third optical recording medium is formed when the objective lens is employed for the third optical recording medium.

BRIEF DESCRIPTION OF THE DRAWINGS

FIGS. 7A to 7D are graphical representations showing one example of correcting the wavefront aberration;

FIGS. 13A to 13C are graphical representations showing the applied voltage in the example 1;

FIGS. 14A to 14C are graphical representations showing the penetrated wavefront in the example 1;

FIGS. 15A and 15B are views showing a constitution example of the liquid crystal panel in a modification of the example 1;

DETAILED DESCRIPTION OF THE PREFERRED EMBODIMENTS

The preferred embodiments of an aberration correcting device and an optical recording medium reproducing apparatus according to the present invention will be described below with reference to the accompanying drawings. In the following, after the main terms used in the embodiments are explained, the outline and features of the embodiments, various examples concerning the embodiments, and finally their modifications will be described.

[Description of terms]

To begin with, the main terms used in this specification will be described. The term "disk (corresponding to an "optical recording medium" as defined in the claims)" as used herein means an information recording medium from which the recorded information is optically read, and more specifically includes BD (Blu-ray Disk), DVD (Digital Versatile Disc), CD (Compact Disk) and AOD (Advanced Optical Disc). These disks are different in at least one of the recording density or the thickness of a cover layer (see FIGS. 2 and 11).

Figure 3:
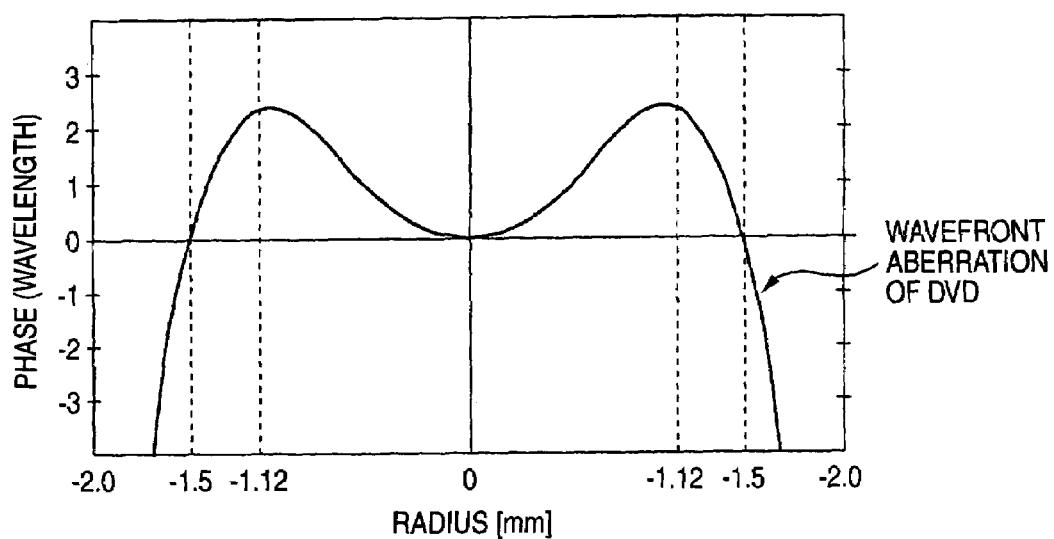
FIG. 3 is a graphical representation showing one example of wavefront aberration occurring when the BD objective lens is employed for DVD.
Figure 4:
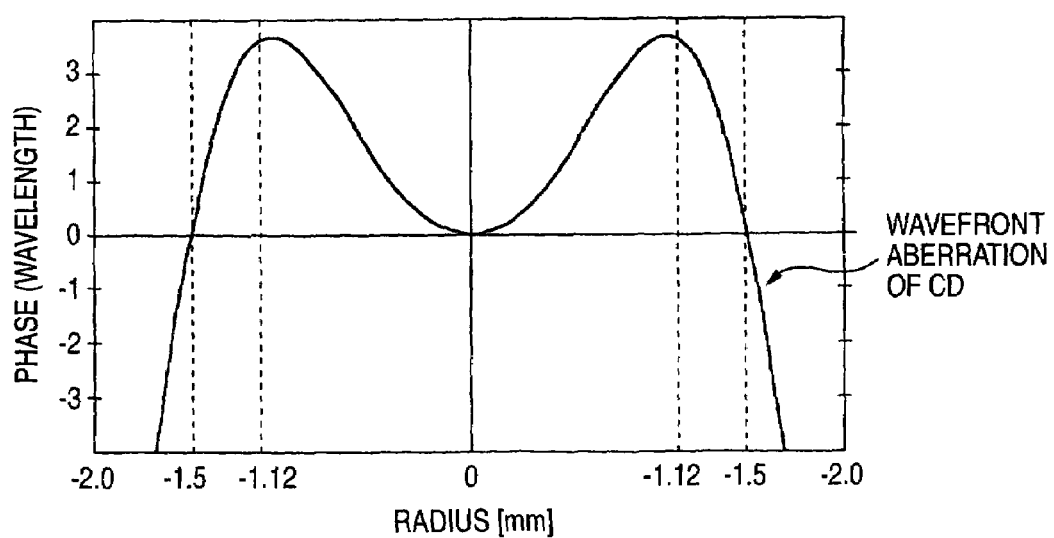
FIG. 4 is a graphical representation showing one example of wavefront aberration occurring when the BD objective lens is employed for CD.

Also, the term "wavefront aberration (corresponding to "aberration" as defined in the claims)" as used herein means the aberration occurring when an objective lens having a different aperture diameter is employed for the disk (principally, a spherical aberration), and more specifically includes a wavefront aberration occurring in the objective lens when the BD objective lens or AOD objective lens is employed for DVD or CD, and when the compatible objective lens among BD, DVD and CD is employed for BD, DVD and CD (see FIGS. 3 and 4). The term "aberration correction" as used herein means the correction for such aberration.

Also, the term "disk reproducing apparatus (corresponding to an "optical recording medium reproducing apparatus" as defined in the claims)" as used herein means the apparatus for reading and reproducing the information recorded in the disk, and more specifically includes the apparatus for reproducing three kinds of recording media, BD, DVD and CD, and the apparatus for reproducing three kinds of recording media, AOD, DVD and CD.

Also, the term "effective diameter" as used herein means the diameter of objective lens contributing to an imaging by a beam spot for recording/reproduction. Also, the term "step difference" as used herein means a part where envelop surface is discontinuous on the penetrated wavefront of liquid crystal. In the embodiment, the state with step difference is optically equivalent to the state without step difference by making the step difference the integral times of wavelength.

[Outline and Features]

Figure 1:
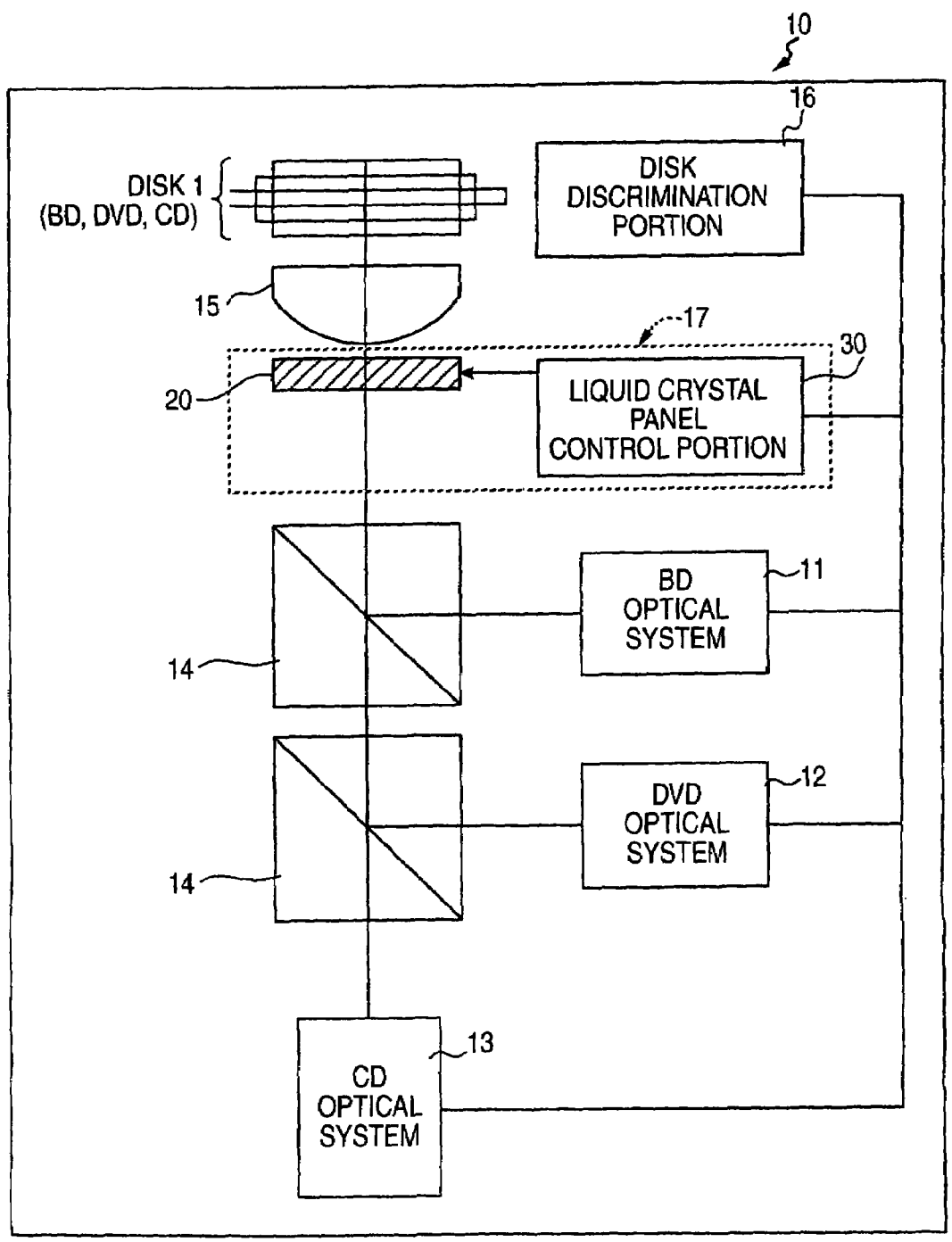
FIG. 1 is a block diagram showing the configuration of a disk reproducing apparatus.

Referring to FIGS. 1 to 11, the outline and features of a disk reproducing apparatus according to an embodiment of the invention will be described below. FIG. 1 is a block diagram showing the configuration of the disk reproducing apparatus 10. Roughly, the disk reproducing apparatus 10 reproduces three kinds of disk 1, BD, DVD and CD, employing a BD objective lens. The disk reproducing apparatus 10 has a BD optical system 11, a DVD optical system 12, a CD optical system 13, two dichroic prisms 14, a BD objective lens 15, a disk discriminating portion 16, and an aberration correcting device 17, as shown in FIG. 1.

Among others, the BD optical system 11 is a unit having a BD light source, a collimator lens, and a detection system, and reading the recorded information of the BD by making light incident upon the BD through a dichroic prism 14, a liquid crystal panel 20 and the BD objective lens 15 from the BD light source. Likewise, the DVD optical system 12 is a unit for reading the recorded information of the DVD by making light incident upon the DVD from a DVD light source, and the CD optical system 13 is a unit for reading the recorded information of the CD by making light incident upon the CD from a CD light source.

Also, the disk discriminating portion 16 is a processing portion for discriminating the kind of disk inserted into an optical disk drive (not shown), and activates any one of the BD optical system 11, the DVD optical system 12 and the CD optical system 13 in accordance with the discrimination result, as well as outputting the kind information of an inserted disk to the aberration correcting device 17.

Figures 2A, 2B:
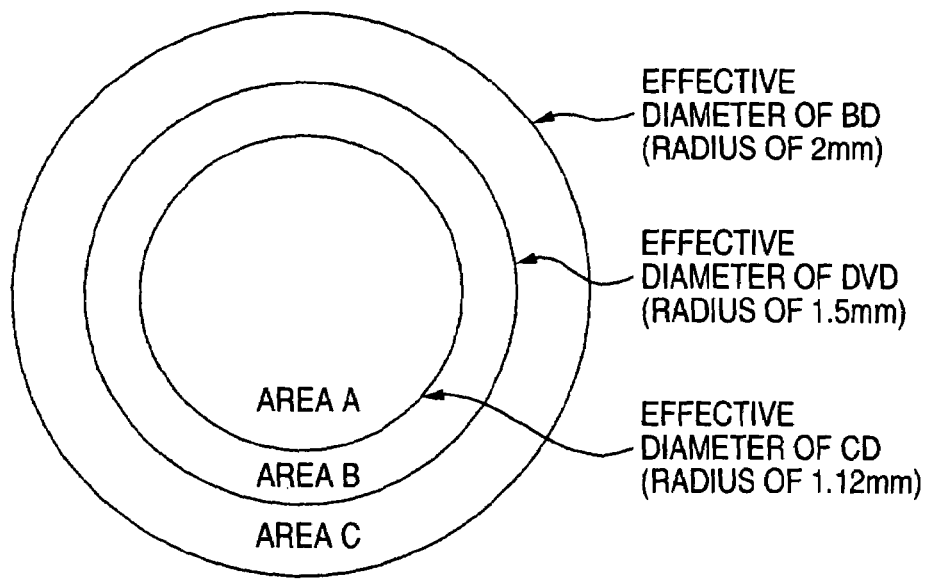
FIGS. 2A and 2B are a table showing the main specifications and effective diameters of BD, DVD and CD.

In this constitution, the disk reproducing apparatus 10 reproduces the BD, DVD or CD, employing the BD objective lens 15, which is the objective lens optimized for the BD having a focal distance of 2.35 mm and an effective diameter of 2 mm in radius ($\phi$4 mm). On the other hand, the DVD and CD are different in the use wavelength, NA and the thickness of cover layer from the BD, as shown in FIG. 2A, and different in the effective diameter from the BD, as shown in FIG. 2B.

Therefore, when the BD objective lens 15 is employed for the DVD, a wavefront aberration occurs, as shown in FIG. 3. Also, when the BD objective lens 15 is employed for the CD, a wavefront aberration occurs, as shown in FIG. 4. Such wavefront aberration disorders a spot formation of light (beam) from the light source, so that the information recorded on the DVD and CD is not directly read, but the aberration correcting device 17 can correct the aberration in the following way.

Roughly, the aberration correcting device 17 corrects the wavefront aberration, and has the liquid crystal panel 20 (corresponding to a "liquid crystal element" as defined in the claims) and a liquid crystal panel control portion 30 (corresponding to a "voltage applying portion" as defined in the claims), as shown in FIG. 1. Among others, the liquid crystal panel 20 is disposed between the BD objective lens 15 and the light source, and one of the refractive index varying media the refractive index of which is variably controlled, whereby the refractive index is variably controlled in accordance with the applied voltage.

Figure 5A:
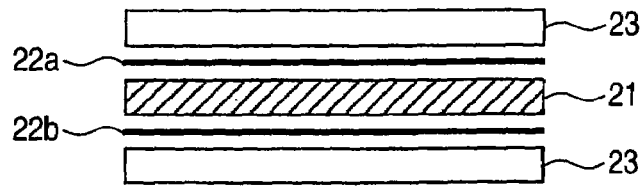
FIGS. 5A to 5C are views showing the constitution of a liquid crystal panel.

More specifically, the liquid crystal panel 20 is typically composed of a liquid crystal (liquid crystal molecules) 21, the refractive index of which is variably controlled in accordance with the applied voltage, the transparent electrode layers (transparent electrodes) 22a and 22b (hereinafter appropriately abbreviated as "electrodes"), the liquid crystal being sandwiched between the transparent electrodes to which voltage is applied by the liquid crystal panel control portion 30, and the glass plates 23 having the transparent electrode layers sandwiched, as shown in FIG. 5A.

Figure 5B:
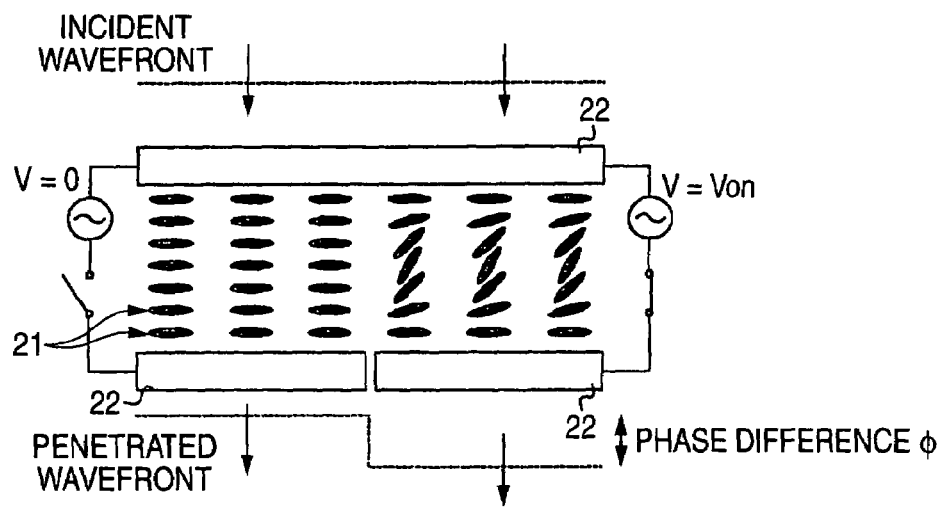
Figure 5C:
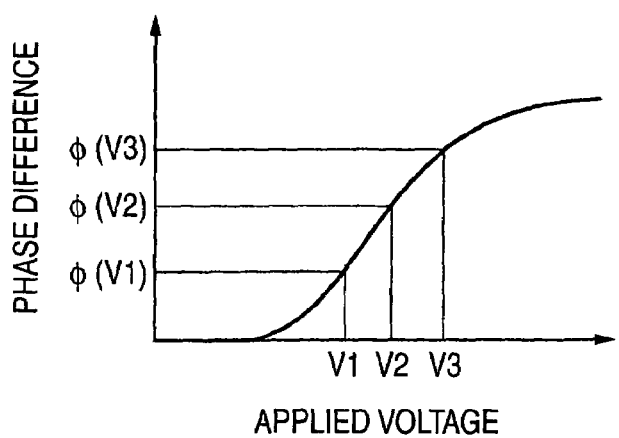

In the liquid crystal panel 20 with this constitution, the liquid crystal molecules 21 are aligned in one direction in a condition where no voltage is applied across two transparent electrodes 22a and 22b, but changed in the orientation under the influence of an electric field generated in a condition where the voltage is applied, as shown in FIG. 5B. That is, since the refractive index is changed in an area where the liquid crystal molecules 21 are changed in the orientation by applying the voltage, light penetrated through the liquid crystal panel 20 produces a penetrated wavefront with a predetermined phase difference $\phi$ in this area alone. Also, the phase difference $\phi$ is arbitrarily controlled in accordance with the magnitude of applied voltage, as shown in FIG. 5C. Accordingly, the penetrated wavefront having any phase difference and shape can be configured by forming the shape of the electrodes 22 at will and controlling the magnitude of applied voltage arbitrarily.

The liquid crystal panel control portion 30 is one of the refractive index control portion for variably controlling the refractive index of liquid crystal molecules 21 to be concentric around the optical axis so that the wavefront of light penetrated through the liquid crystal panel 20 may form the penetrated wavefront having any phase difference concentrically around the optical axis, in which voltage is applied across the transparent electrodes 22 of the liquid crystal panel 20 to the liquid crystal molecules 21.

Herein, the constitution of the liquid crystal panel 20 will be described below. To form the penetrated wavefront spreading concentrically around the optical axis as described above, it is required to constitute the liquid crystal panel 20 such that a plurality of electrodes 22 are arranged concentrically around the optical axis along the liquid crystal molecules 21 on the glass substrates 23 of the liquid crystal panel 20. Typical of the constitution example are the "segment type" and the "gradation type". In the following, the constitution examples of "segment type" and "gradation type" will be given, but for the convenience of explanation, it is supposed that the transparent electrode layer 22b is grounded (at potential 0V over the entire surface), and the transparent electrode layer 22a is provided with the electrode patterns of "segment type" and "gradation type".

Figure 6A:
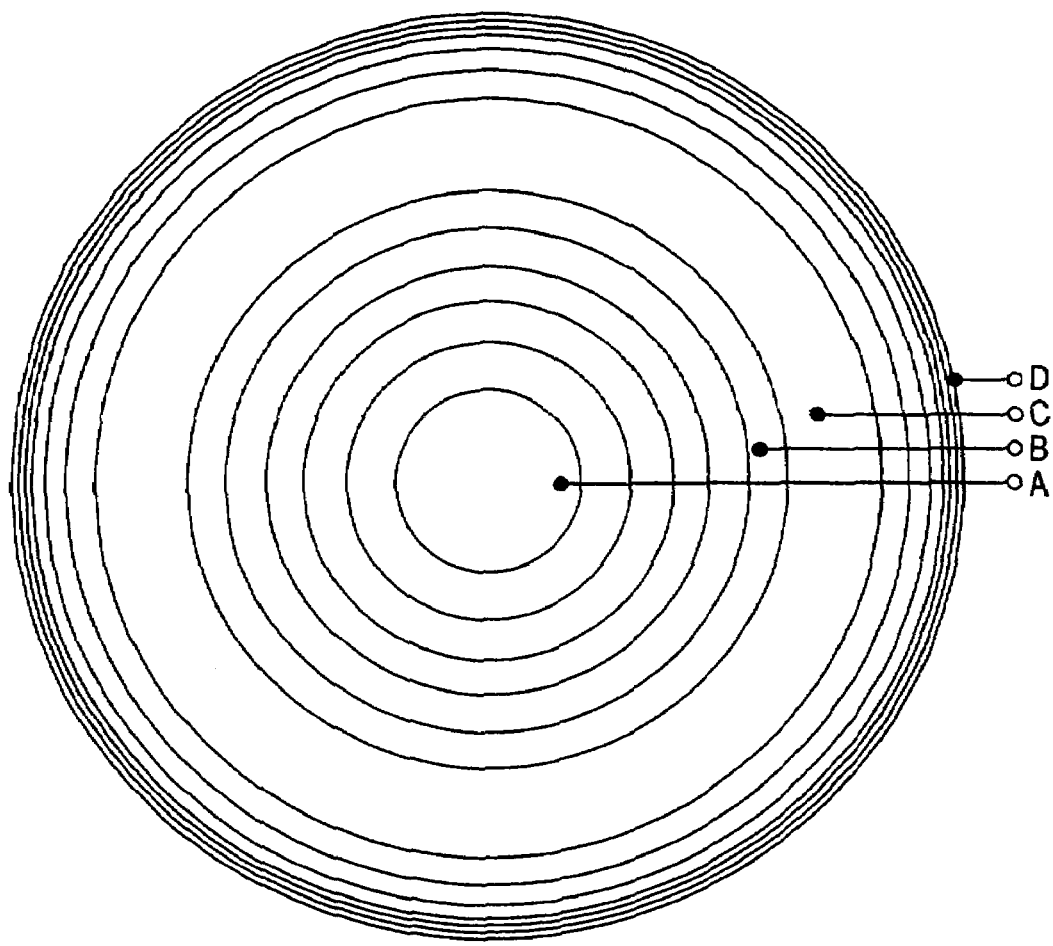
FIGS. 6A and 6B are views showing a constitution example of the liquid crystal panel (segment type)
Figure 6B:
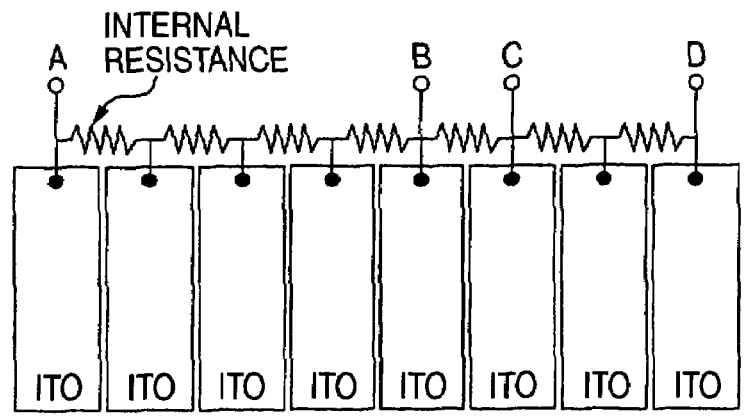

FIGS. 6A and 6B is views showing a constitution example (segment type) of the liquid crystal panel 20. The liquid crystal panel 20 of this segment type has a plurality of transparent electrodes having low resistance and concentric circle shape, in which a resistive element made of the same material as the transparent electrode connects between adjacent electrodes, and the voltage from the liquid crystal panel control portion 30 is applied to each of predetermined electrodes (A, B, C, D), as shown in FIGS. 6A and 6B.

And in a case where the liquid crystal panel 20 is the segment type, the voltage distribution in which voltage spreads stepwise concentrically around the optical axis is formed by applying the voltage of any magnitude to the electrodes (A, B, C, D), as shown in FIG. 7A, whereby a penetrated wavefront spreading stepwise concentrically around the optical axis is formed on the liquid crystal panel 20, as shown in FIG. 7B. Accordingly, even when the wavefront aberration occurs as shown in FIG. 7C, a penetrated wavefront (in reverse phase corresponding to the wavefront aberration) is applied to the liquid crystal panel 20, as shown in FIG. 7B, whereby the wavefront aberration is corrected as shown in FIG. 7D.

Figure 8A:
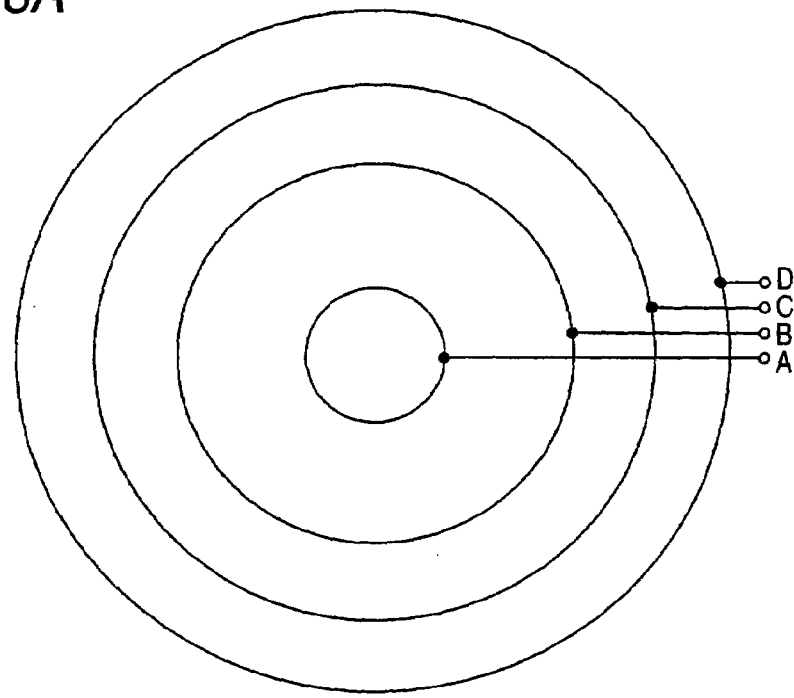
FIGS. 8A to 8C are views showing a constitution example of the liquid crystal panel (gradation type)
Figure 8B:
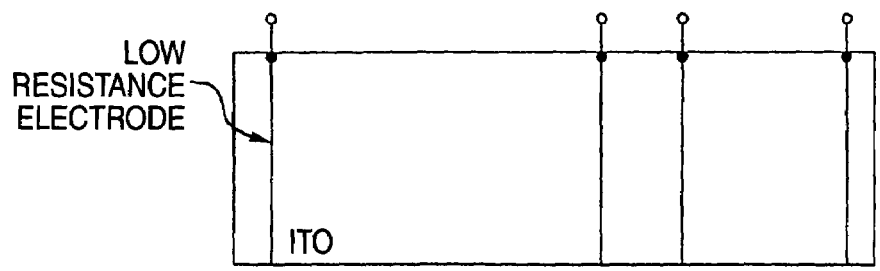
Figure 8C:
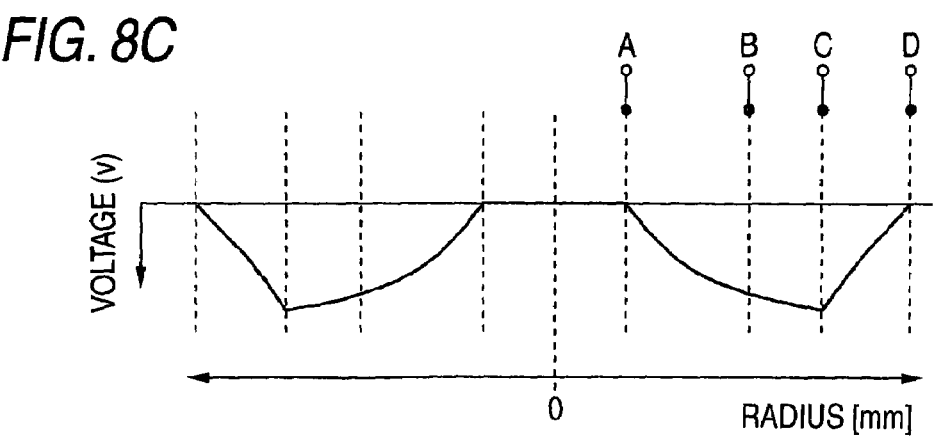

Also, FIGS. 8A to 8C are views showing a constitution example (gradation type) of the liquid crystal panel 20. The liquid crystal panel 20 of this gradation type has a plurality of electrodes (A, B, C, D) having low resistance and concentric circle shape on a transparent electrode (ITO) having high resistance and without division, in which the voltage from the liquid crystal panel control portion 30 is applied to each of the electrodes (A, B, C, D), as shown in FIGS. 8A and 8B.

And in a case where the liquid crystal panel 20 is the gradation type, the voltage distribution in which voltage spreads smoothly concentrically around the optical axis is formed by applying the voltage of any magnitude to the electrodes (A, B, C, D), as shown in FIG. 8C, whereby a penetrated wavefront spreading smoothly concentrically around the optical axis is formed on the liquid crystal panel 20. Accordingly, even when the liquid crystal panel 20 is the gradation type, it is possible to correct the wavefront aberration by applying a penetrated wavefront in reverse phase corresponding to the wavefront aberration to the liquid crystal panel 20.

Therefore, the disk reproducing apparatus 10 according to the embodiment has the liquid crystal panel 20 capable of forming the penetrated wavefront in reverse phase corresponding to the wavefront aberration, presupposing the wavefront aberration occurring when the BD objective lens 15 is employed for the DVD, and the wavefront aberration occurring when the BD objective lens 15 is employed for the CD, whereby the wavefront aberration is corrected by applying predetermined voltage from the liquid crystal panel control portion 30 to the liquid crystal panel 20.

And the disk reproducing apparatus 10 according to the embodiment has a main feature of aberration correction in the aberration correcting device 17 (liquid crystal panel 20 and liquid crystal panel control portion 30). More specifically, conventionally, even if the wavefront aberration occurring when the BD objective lens 15 is employed for the DVD or CD is corrected, the effective diameter (see FIG. 2B) of DVD or CD is not directly dealt with, whereby the aperture restriction was made separately from the aberration correction in such a way as to shield light with the liquid crystal shutter.

Figure 9:
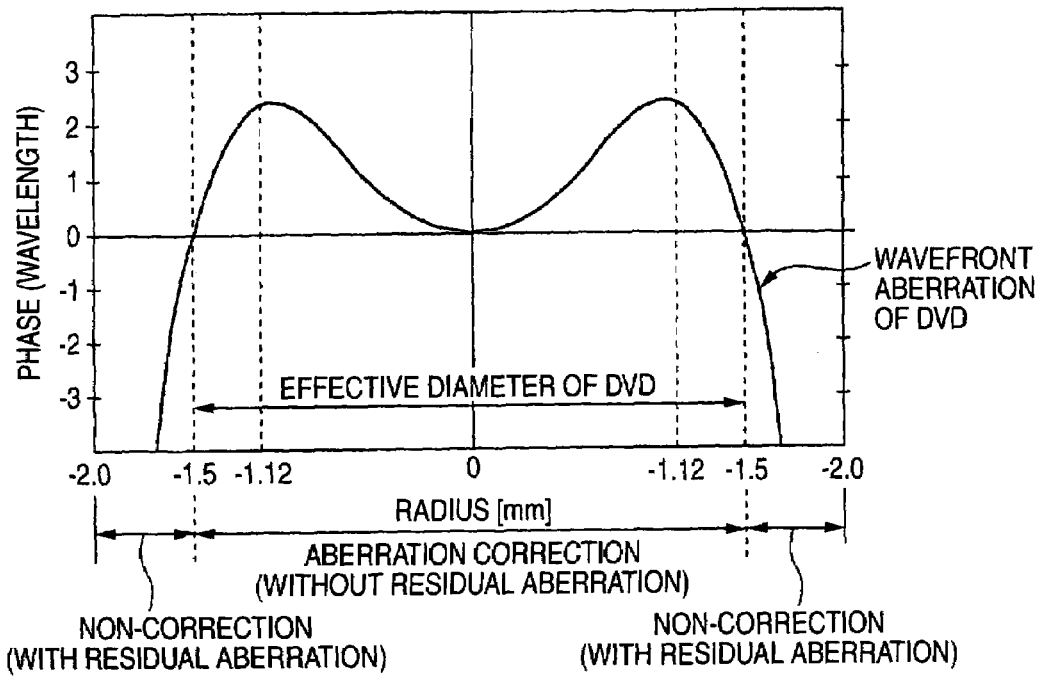
FIG. 9 is a graphical representation showing a range of aberration corrected when the BD objective lens is employed for DVD.
Figure 10:
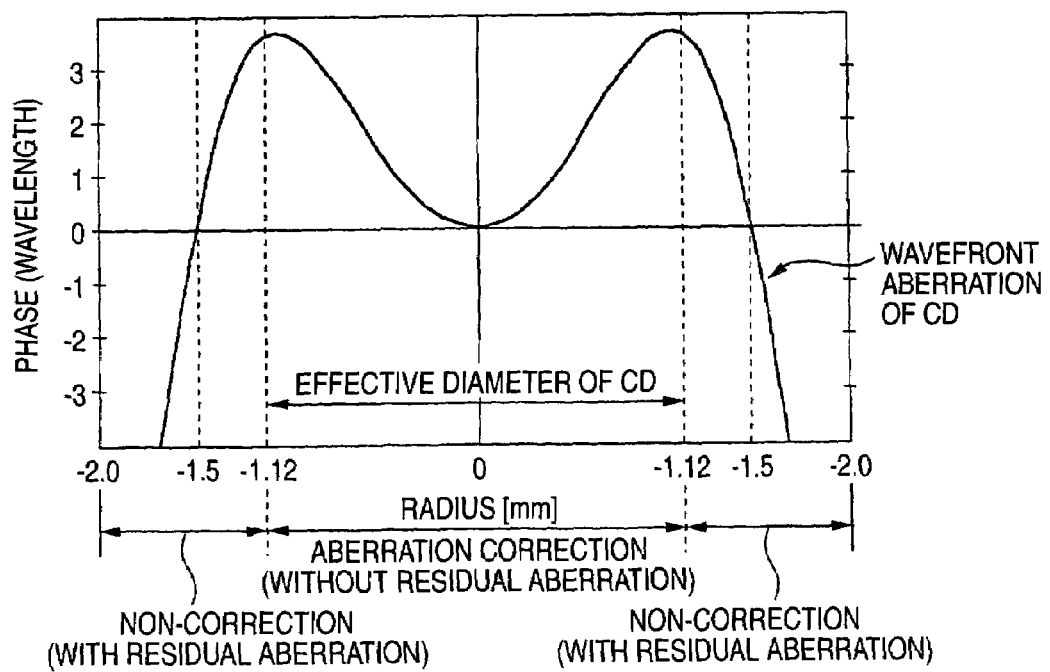
FIG. 10 is a graphical representation showing a range of aberration corrected when the BD objective lens is employed for CD.

On the contrary, with respect to the aberration occurring when the BD objective lens 15 is employed for the DVD or CD, the disk reproducing apparatus 10 according to the embodiment corrects only the aberration occurring inside the effective diameter among the aberration occurring outside and inside the effective diameter (see FIG. 2B) of each disk 1 (DVD and CD). That is, the aberration correcting device 17 corrects only the aberration occurring inside the effective diameter of DVD, and leaving the aberration outside the effective diameter, when the DVD is reproduced, as shown in FIG. 9. Likewise, when the CD is reproduced, it corrects only the aberration occurring inside the effective diameter of CD, and leaves the aberration outside the effective diameter, as shown in FIG. 10. As a result of the aberration correction, light passing outside the effective diameter of DVD or CD does not contribute to spot formation under the influence of residual aberration, giving rise to substantially the same effect as when the aperture is restricted inside the effective diameter of DVD or CD.

Accordingly, the disk reproducing apparatus 10 according to the embodiment (in more detail, the aberration correcting device 17) substantially performs the aperture restriction only by the aberration correction, even when the BD objective lens 15 is employed for the DVD or CD, whereby an excellent beam spot is simply obtained on the signal recording plane in reproducing the disk.

Figures 11A, 11B:
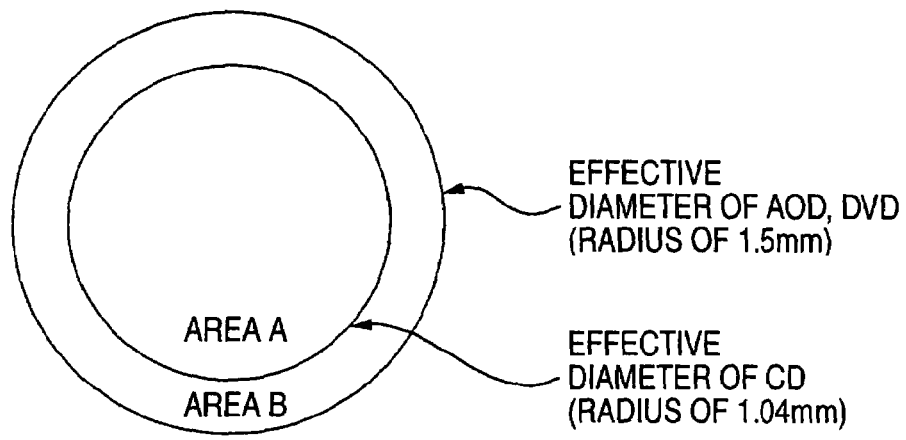
FIGS. 11A and 11B are a table showing the main specifications and effective diameters of AOD, DVD and CD.

By the way, the outline and features of the embodiment have been described above using an example of the disk reproducing apparatus 10 for reproducing the BD, DVD and CD employing the BD objective lens 15, but not necessarily limited to this disk reproducing apparatus 10. For example, when the objective lens having different aperture diameter is employed for the disk, such as when each disk is reproduced employing the AOD objective lens for the AOD, DVD and CD having the specifications as shown in FIG. 11A, and when each disk (BD, DVD and CD) is reproduced employing the objective lens compatible to BD, DVD and CD, the above contents can be similarly applied. That is, when the wavefront aberration occurs, employing the objective lens having different aperture diameter for various kinds of disk 1, it is only necessary to correct the aberration occurring inside the effective diameter of the disk 1.

In the following, various examples (modifications) of the disk reproducing apparatus 10 according to the embodiment will be described. Since the schematic constitution of each example is the same as the disk reproducing apparatus 10, the detailed description of each portion is omitted, and the aberration correcting device 17 in the disk reproducing apparatus 10 will be principally described.

EXAMPLE 1

Figure 12A:
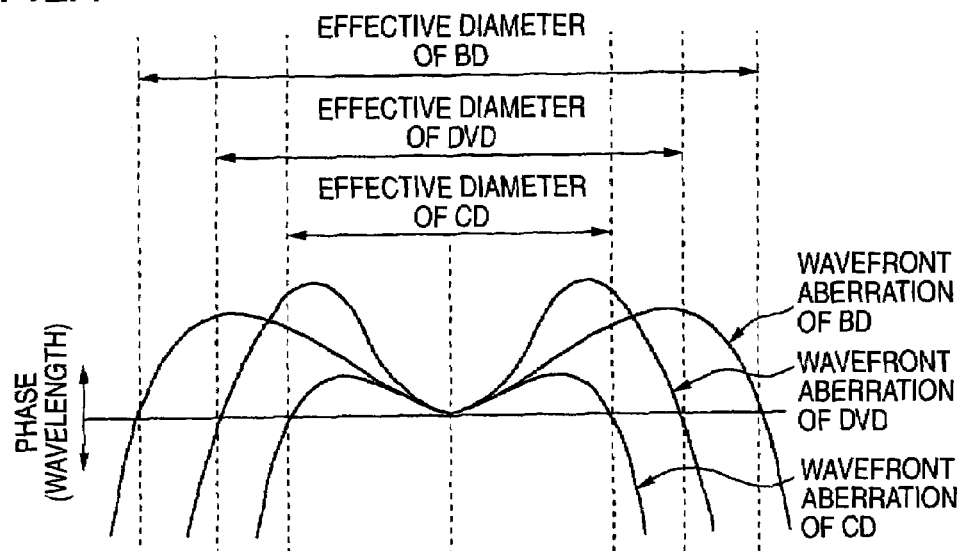
FIGS. 12A and 12B are view showing a constitution example of the liquid crystal panel in the example 1.

In an example 1, the disk reproducing apparatus 10 for reproducing the BD, DVD and CD employing an objective lens compatible to BD, DVD and CD will be described with reference to FIGS. 12 to 14. This objective lens is not optimized to any disk, and when this objective lens is employed for the BD, DVD and CD, the wavefront aberration of non-similar shape in which the radial position of phase zero is different for each disk occurs, as shown in FIG. 12A.

Figure 12B:
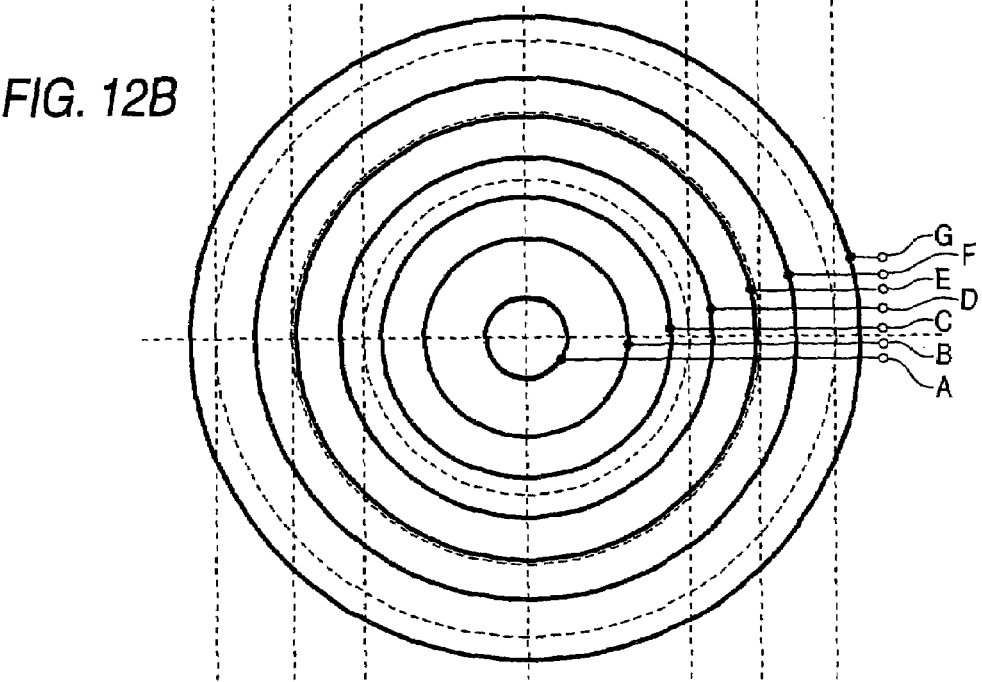

The liquid crystal panel 20 of the example 1 has an electrode pattern of gradation type inside the effective diameter of BD, in which the voltage is applied independently from the liquid crystal panel control portion 30 to each of the electrodes (A, B, C, D, E, F, G), as shown in FIG. 12B. The reason why the electrode pattern is constituted inside the effective diameter of BD is that the BD, DVD and CD are disks of correction object.

Moreover, this liquid crystal panel 20 is provided with the electrode pattern so that when the magnitude of voltage applied to each of the electrodes (A, B, C, D, E, F, G) is changed at will, the penetrated wavefront in reverse phase corresponding to the wavefront aberration occurring in an area inside the effective diameter of BD during reproduction of the BD, the penetrated wavefront in reverse phase corresponding to the wavefront aberration occurring in an area inside the effective diameter of DVD during reproduction of the DVD, and the penetrated wavefront in reverse phase corresponding to the wavefront aberration occurring in an area inside the effective diameter of CD during reproduction of the CD may be formed. The reason why the electrode pattern is constituted supposing the wavefront aberration of each disk is that the wavefront aberration has the non-similar shape. Also, the reason why the electrode pattern is constituted supposing the wavefront aberration inside the effective diameter of each disk is that the wavefront aberration is not corrected outside the effective diameter of each disk, as will be described later.

In this liquid crystal panel 20, the electrodes are shared to reduce the number of electrodes in a range where the aberration of non-similar shape occurring in reproducing each disk (BD, DVD and CD) is roughly corrected, as shown in FIG. 12B. That is, though the electrodes (D, E, G in FIG. 12B) are arranged at the positions corresponding to the effective diameter of each disk, the electrode pattern is constituted between the effective diameter of each disk with the least number of electrodes (B, C, F in FIG. 12B) to approximately correspond to each aberration, without arranging a number of electrodes to form the penetrated wavefront fully corresponding to the aberration of non-similar shape for each disk.

The liquid crystal panel control portion 30 of the example 1 selectively switches the magnitude of voltage to be applied to each of the electrodes (A, B, C, D, E, F, G) of the liquid crystal panel 20 in accordance with the kind of disk (kind information input from the disk discriminating portion 16). More specifically, when the CD is reproduced, the voltage of preset magnitude is applied to each of the electrodes (A, B, C) inside the effective diameter of CD, supposing the wavefront aberration, but the same voltage is applied to the electrodes (D, E, F, G) outside the effective diameter of CD without regard to the aberration, as shown in FIG. 13A.

Similarly, when the DVD is reproduced, the voltage of preset magnitude is applied to each of the electrodes (A, B, C, D) inside the effective diameter of DVD, supposing the wavefront aberration, but the same voltage is applied to the electrodes (E, F, G) outside the effective diameter of DVD without regard to the aberration, as shown in FIG. 13B. Moreover, when the BD is reproduced, the voltage of preset magnitude is applied to each of the electrodes (A, B, C, D, E, F) inside the effective diameter of DVD, supposing the wavefront aberration.

As a result, in the liquid crystal panel 20, only the aberration occurring in the area inside the effective diameter of each disk is corrected, but the aberration is not still corrected outside the effective diameter of each disk, as shown in FIGS. 14A to 14C. Thereby, light passing outside the effective diameter of each disk does not contribute to spot formation under the influence of residual aberration, giving rise to substantially the same effect as when the aperture is restricted inside the effective diameter of each disk.

As described above, in the example 1, for the aberration occurring when one objective lens is employed for BD, DVD and CD, voltage is applied to form the penetrated wavefront having a phase distribution for correcting only the aberration occurring in the area inside the effective diameter of each disk. Thereby, since the aperture is restricted inside the effective diameter of each disk, the aperture restriction is substantially made only by the aberration correction, even when the objective lens having different aperture diameter is employed for the disk, whereby it is possible to simply produce an excellent beam spot on the signal recording plane in reproducing each disk.

Also, in the example 1, among a plurality of electrodes arranged concentrically around the optical axis along the liquid crystal 21, the voltage of predetermined magnitude is applied to a plurality of electrodes arranged in an area inside the effective diameter of each disk to form the penetrated wavefront having a shape corresponding to the aberration occurring in this area, while the voltage of predetermined magnitude is applied to a plurality of electrodes arranged in an area outside the effective diameter of each disk to form the penetrated wavefront not having a shape corresponding to the aberration occurring in this area. Thereby, the aberration correction as well as substantially the aperture restriction can be made only by performing the voltage control differently inside and outside the effective diameter of each disk.

Also, in the example 1, the electrodes are shared by reducing the number of electrodes in a range where the aberration of non-similar shape occurring when reproducing each disk (BD, DVD and CD) can be roughly corrected, and the magnitude of voltage to be applied to each electrode is switched in accordance with the kind of disk. Thereby, the number of electrodes to be controlled is reduced, and the aberration correction and the aperture restriction are implemented under simple control.

Modification of Example 1

By the way, though the example 1 has been described above, the contents of the example 1 may be practiced in various other ways, besides the above description. For example, in the example 1, the same voltage is applied to the electrodes outside the effective diameter of disk (see FIGS. 13A to 13C). Though this constitution is made to implement the simple control, the invention is not necessarily limited to this form. A different voltage may be applied to each electrode, as far as the aberration is not corrected outside the effective diameter.

Also, in the example 1, the objective lens compatible to BD, DVD and CD is employed, but the invention is not necessarily limited to this objective lens, and may be also applied to the case where the BD objective lens 15 optimized for the BD is employed. Moreover, in this case, it is only necessary to correct the aberration inside the effective diameter of DVD, as shown in FIG. 15A, whereby the number of electrodes to be controlled is further reduced by arranging the electrodes only inside the effective diameter of DVD, as shown in FIG. 15B.

Also, in this example 1, the BD, DVD and CD are reproduced, but the invention is not necessarily limited thereto. The invention is similarly applied to the case where the objective lens having different aperture diameter is employed for the disk, such as the case where the AOD, DVD and CD having the specifications as shown in FIG. 11A are reproduced by one objective lens, and the case where the BD and DVD are reproduced by the objective lens compatible to BD and DVD.

In the example 1, the liquid crystal panel 20 has the electrode pattern of gradation type, but the invention is not necessarily limited to the gradation type. The invention is also applicable to the liquid crystal panel having the electrode pattern of so-called segment type. Moreover, the constitution of electrode pattern is only exemplary, but may be also applied as far as the penetrated wavefront is formed.

EXAMPLE 2

In an example 2, the disk reproducing apparatus 10 for reproducing the BD, DVD and CD employing the BD objective lens 15 will be described with reference to FIGS. 16 to 21. That is, though in the above "modification of example 1", the BD, DVD and CD are reproduced employing the BD objective lens 15, further variations of the example 1 and its modification are given in the example 2. In the example 2, the BD objective lens 15 is optimized for the BD (e.g., focal distance of 2.35 mm and effective diameter of 2 mm in radius), and only when employed only for the DVD and CD, the wavefront aberration of similar shape occurs in which the radial position of phase zero overlaps in the effective diameter of DVD, as shown in FIG. 15A.

Figure 16:
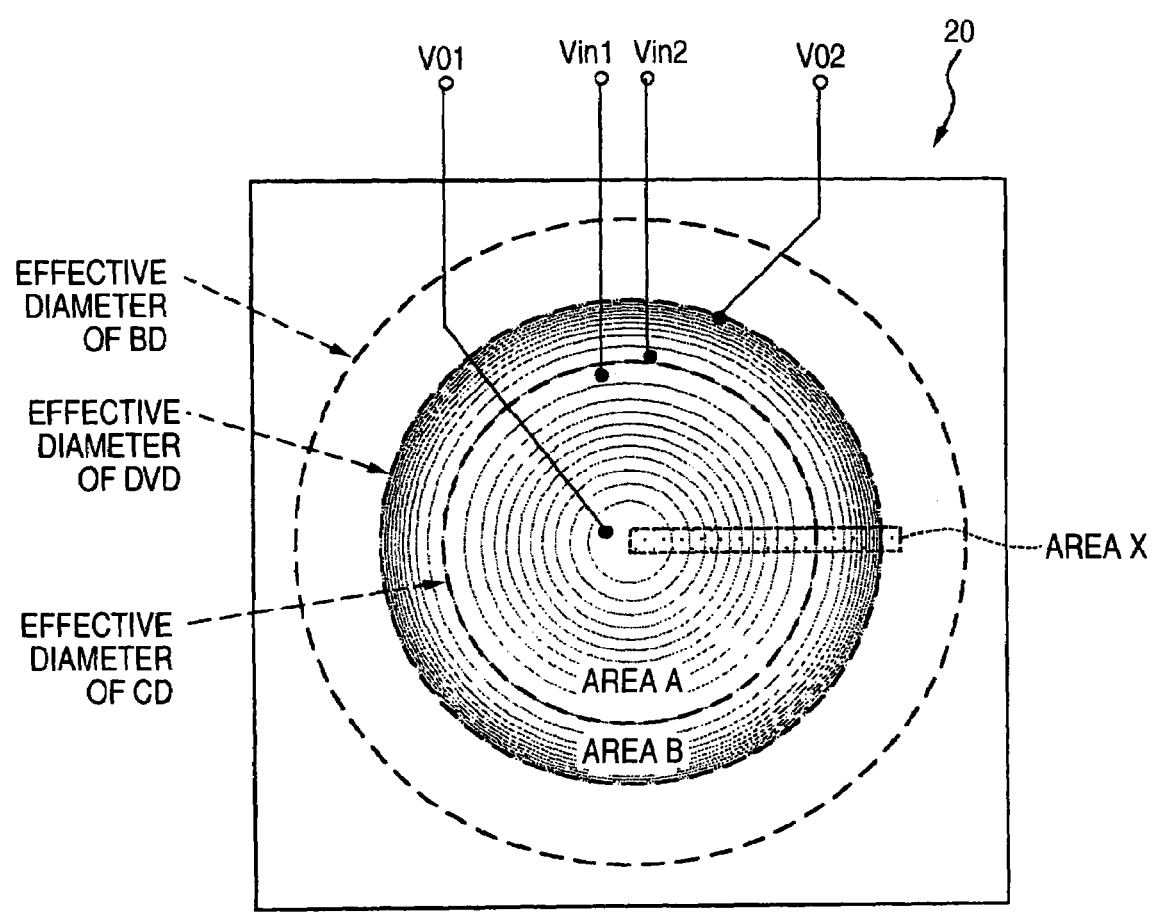
FIG. 16 is a view showing a constitution example of the liquid crystal panel in the example 2.
Figure 17:
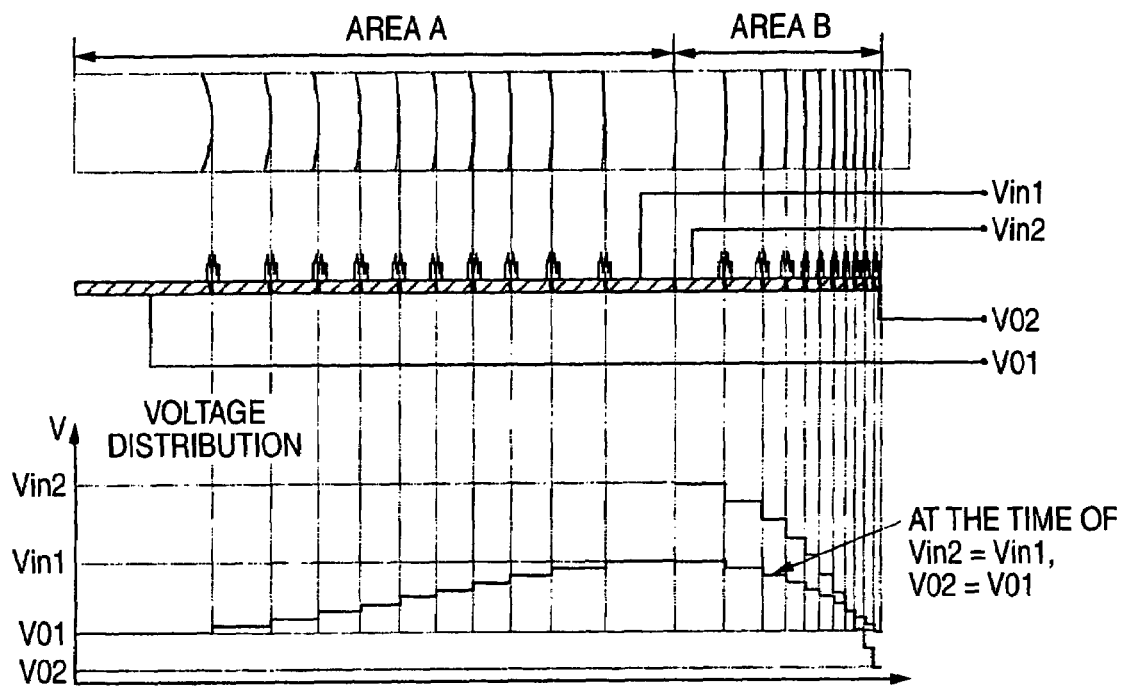
FIG. 17 is a graphical representation showing the applied voltage in the example 2.

The liquid crystal panel 20 of the example 2 has an electrode pattern of segment type inside the effective diameter of DVD, in which the voltage is applied independently from the liquid crystal panel control portion 30 via each of the electrodes (V01, Vin1, Vin2, V02) to the area A corresponding to the inside of the effective diameter of CD and the area B corresponding to the inside of the effective diameter of DVD and the outside of the effective diameter of CD, as shown in FIG. 16. That is, the liquid crystal panel 20 is constituted such that the voltage of any magnitude is applied to electrode Vin1 on the outermost side of the area A and electrode Vin2 on the innermost side of the area B, while a bias voltage is applied to electrode V01 on the innermost side of the area A and electrode V02 on the outermost side of the area B, as shown in FIG. 17.

The reason why the electrode pattern is constituted inside the effective diameter of DVD is that the DVD and CD are disks of correction object. Also, the reason why the electrode pattern is constituted so that voltage may be applied to the areas A and B independently is that different voltage control is made for the areas A and B, as described later.

Moreover, in this liquid crystal panel 20, the electrode pattern is constituted so that when the bias voltages of electrodes V01 and V02 are the fixed voltage (V01=V02), and the voltage of predetermined equal magnitude is applied to the electrodes Vin1 and Vin2, the penetrated wavefront in reverse phase corresponding to the wavefront aberration occurring in the area (areas A and B) inside the effective diameter of DVD when reproducing the DVD may be formed.

The reason why the electrode pattern is constituted supposing the wavefront aberration of DVD is that the wavefront aberration of DVD and CD has the similar shape to deal with the wavefront aberration of CD only by change in the amplitude (change in the applied voltage). That is, the magnitude of voltage to be applied to the electrodes Vin1 and Vin2 is arbitrarily changed, so that only the amplitude of penetrated wavefront formed in the areas A and B can be changed independently to deal with the wavefront aberration of DVD and CD, as shown in FIG. 17. Also, the reason why the electrode pattern is constituted supposing the wavefront aberration inside the effective diameter of DVD is that the wavefront aberration is not corrected outside the effective diameter of DVD.

Figure 18:
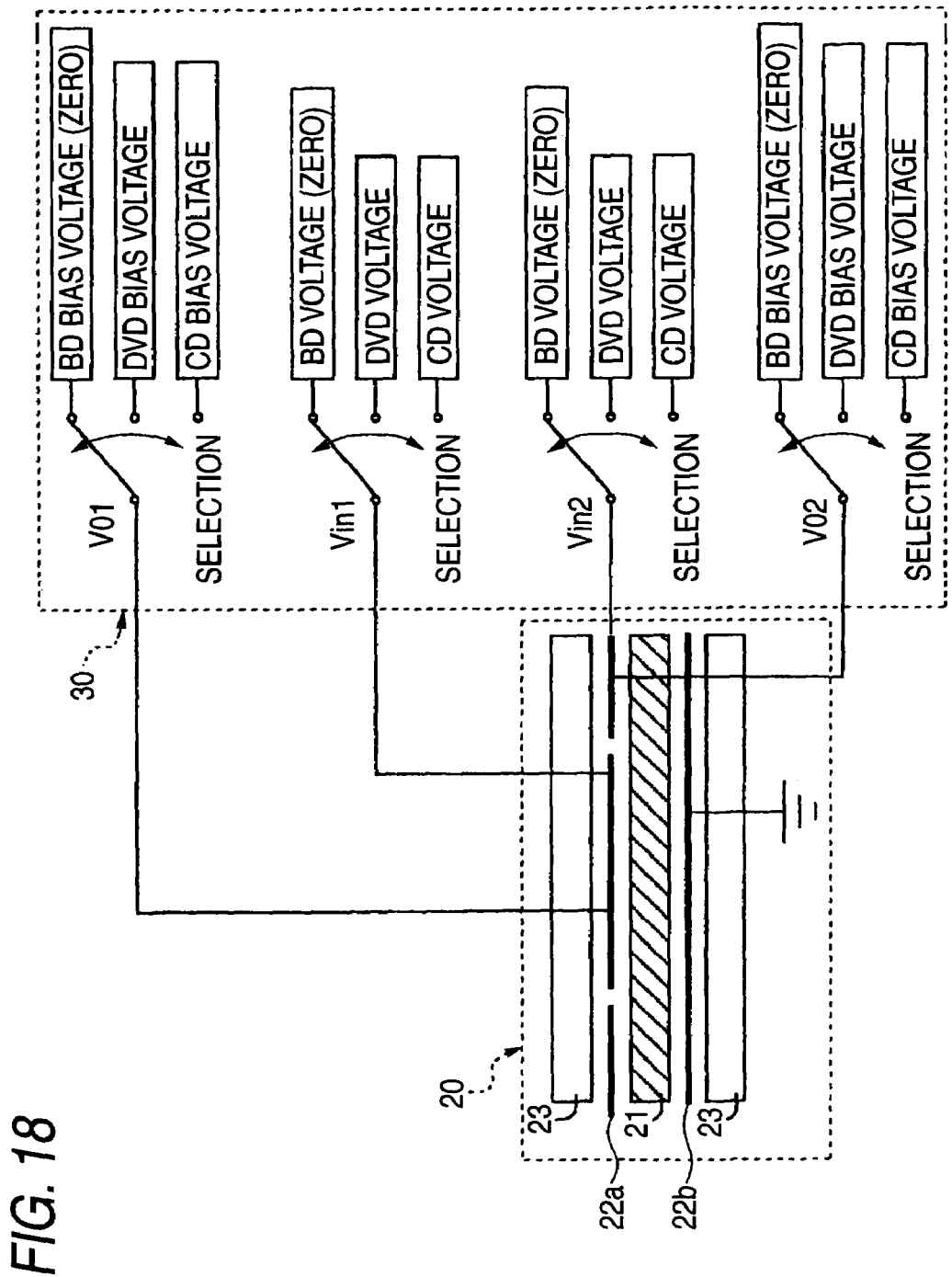
FIG. 18 is a view showing the selection of voltage in the example 2.

The liquid crystal panel control portion 30 of the example 2 selectively switches the magnitude of voltage to be applied to each of the electrodes (V01, Vin1, Vin2, V02) of the liquid crystal panel 20 in accordance with the kind of disk (kind information input from the disk discriminating portion 16), as shown in FIG. 18. More specifically, when the BD is reproduced, a zero voltage is applied to each of the electrodes (V01, Vin1, Vin2, V02) to disable the liquid crystal panel 20 to be operated.

Also, when the DVD is reproduced, the voltage is applied to form the "penetrated wavefront having an amplitude corresponding to aberration occurring in each area". That is, the bias voltages of electrodes V01 and V02 are the fixed voltage (V01=V02), and the preset voltage of equal magnitude is applied to the electrodes Vin1 and Vin2, supposing the wavefront aberration occurring in the areas A and B.

Figure 19:
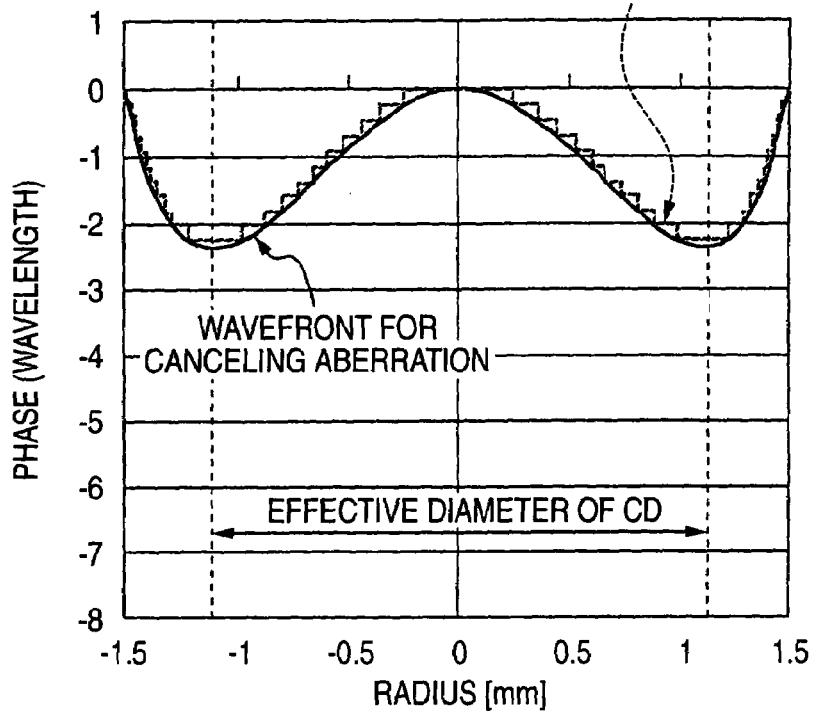
FIG. 19 is a graphical representation showing one example of the penetrated wavefront for DVD in the example 2.

As a result, in the liquid crystal panel 20 as shown in FIG. 19, since only the aberration occurring in the area (areas A and B) inside the effective diameter of DVD is corrected, the light passing outside the effective diameter of DVD does not contribute to spot formation under the influence of residual aberration, giving rise to substantially the same effect as when the aperture is restricted inside the effective diameter of DVD.

Figure 20:
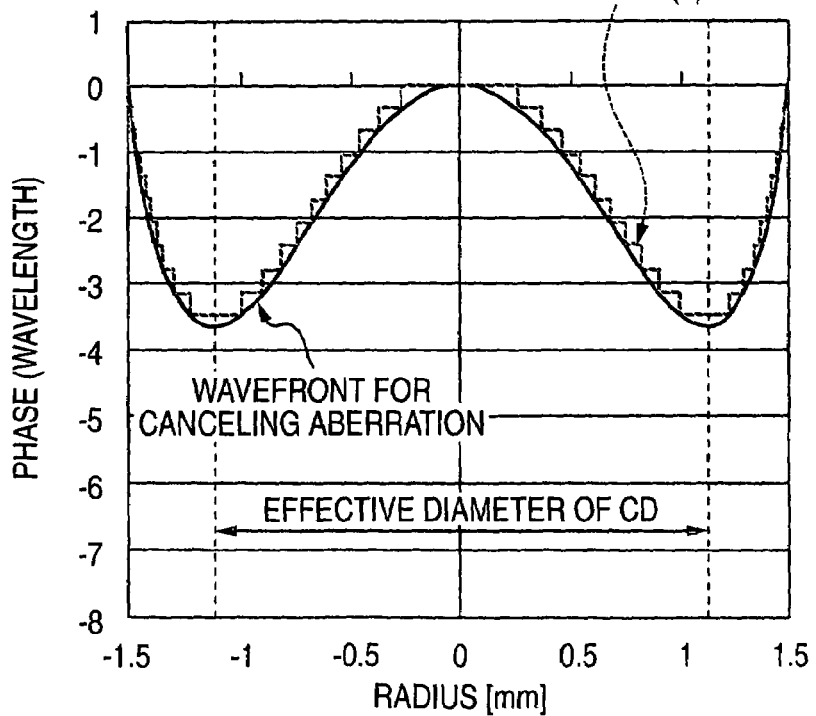
FIG. 20 is a graphical representation showing an amplitude ratio of the penetrated wavefront.

On the other hand, the penetrated wavefront having a phase difference to correct the wavefront aberration when reproducing the CD has an amplitude ratio of about 1.58 to the penetrated wavefront for DVD (see FIG. 19), as shown in FIG. 20. Thus, the liquid crystal panel control portion 30 applies the voltage to form the "penetrated wavefront having an amplitude ratio of about 1.58 to the penetrated wavefront for DVD (see FIG. 19) in the area A but not about 1.58 in the area B" when the CD is reproduced. That is, the voltage of preset magnitude is applied to the electrode Vin1 to have the amplitude ratio (about 1.58), but the voltage of preset magnitude is applied to the electrode Vin2 to have a different amplitude ratio from the above amplitude (e.g., about 0.79).

Figure 21:
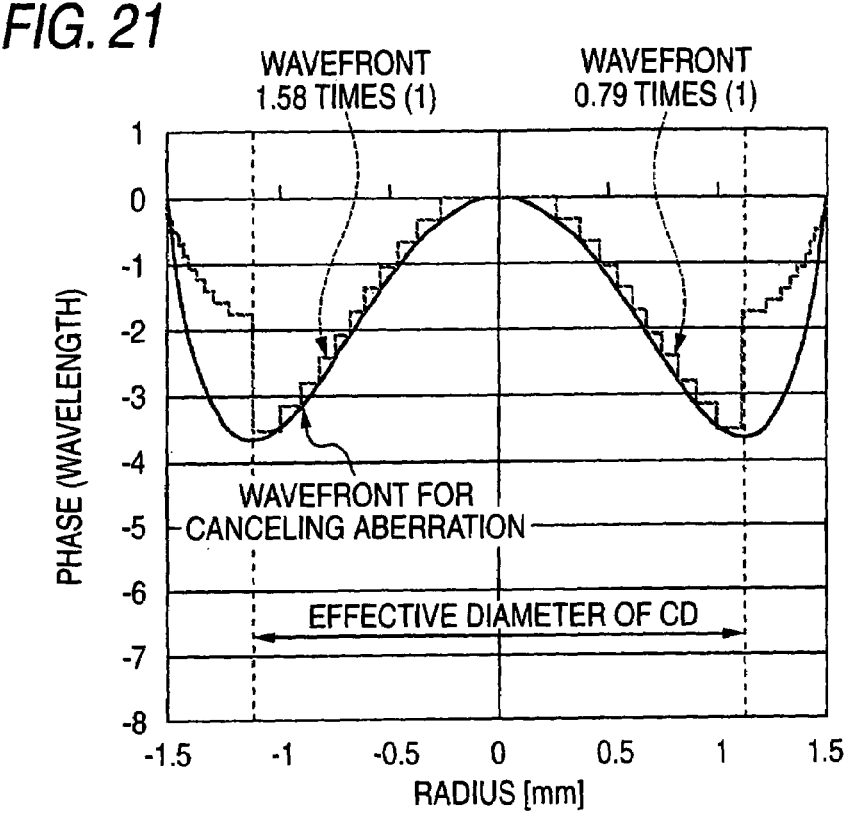
FIG. 21 is a graphical representation showing one example of the penetrated wavefront for CD in the example 2.

As a result, in the liquid crystal panel 20 as shown in FIG. 21, since only the aberration occurring in the area (area A) inside the effective diameter of CD is corrected, the light passing outside the effective diameter of CD does not contribute to spot formation under the influence of residual aberration, giving rise to substantially the same effect as when the aperture is restricted inside the effective diameter of CD.

As described above, in the example 2, for the aberration occurring when the BD objective lens 15 is employed for DVD and CD, voltage is applied to form the penetrated wavefront having a phase distribution for correcting only the aberration occurring in the area inside the effective diameter of DVD, when the BD objective lens 15 is employed for DVD, or voltage is applied to form the penetrated wavefront having a phase distribution for correcting only the aberration occurring in the area inside the effective diameter of CD, when the BD objective lens 15 is employed for CD. Thereby, since the aperture restriction is substantially made only by the aberration correction, even when the BD objective lens 15 is employed for the DVD and CD, it is possible to simply produce an excellent beam spot on the signal recording plane in reproducing each disk.

Also, in the example 2, voltage of any magnitude is applied independently to the area A corresponding to the inside of the effective diameter of CD and the area B corresponding to the outside of the effective diameter of CD and the inside of the effective diameter of DVD, whereby the amplitude of penetrated wavefront formed in each area is variably controlled. More specifically, when the DVD is reproduced, the voltage of predetermined magnitude is applied to the areas A and B to form the penetrated wavefront having an amplitude corresponding to the aberration occurring in each area. Also, when the CD is reproduced, the voltage of predetermined magnitude is applied to the area A to form the penetrated wavefront having an amplitude corresponding to the aberration occurring in the area, or the voltage of predetermined magnitude is applied to the area B to form the penetrated wavefront not having an amplitude corresponding to the aberration occurring in the area. In this way, the aberration correction as well as substantially the aperture restriction can be made only by performing the voltage control differently in the areas A and B.

Also, in the example 2, when the CD is reproduced, the voltage of predetermined magnitude is applied to the area A to form the penetrated wavefront having a predetermined amplitude ratio (e.g., 1.58) to the penetrated wavefront formed in the area A when the DVD is reproduced, or the voltage of predetermined magnitude is applied to the area B to form the penetrated wavefront having a different amplitude ratio (e.g., 0.79). In this way, the aberration correction as well as substantially the aperture restriction can be made only by producing the penetrated wavefront having different amplitude ratio in the areas A and B.

Also, in the examples 2, when the DVD is reproduced, the voltage of equal magnitude is applied to the areas A and B. In this way, the penetrated wavefront of the area A and the penetrated wavefront of the area B can be smoothly linked.

Modification of Example 2

Figure 22:
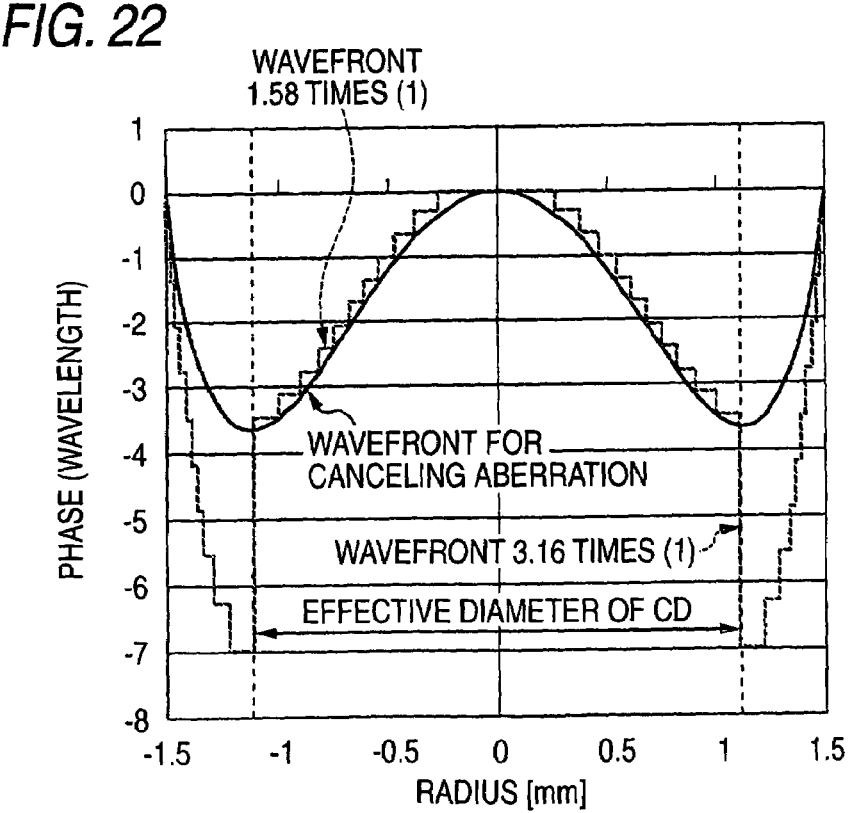
FIG. 22 is a graphical representation showing one example of the penetrated wavefront for CD in a modification of the example 2.
Figure 23:
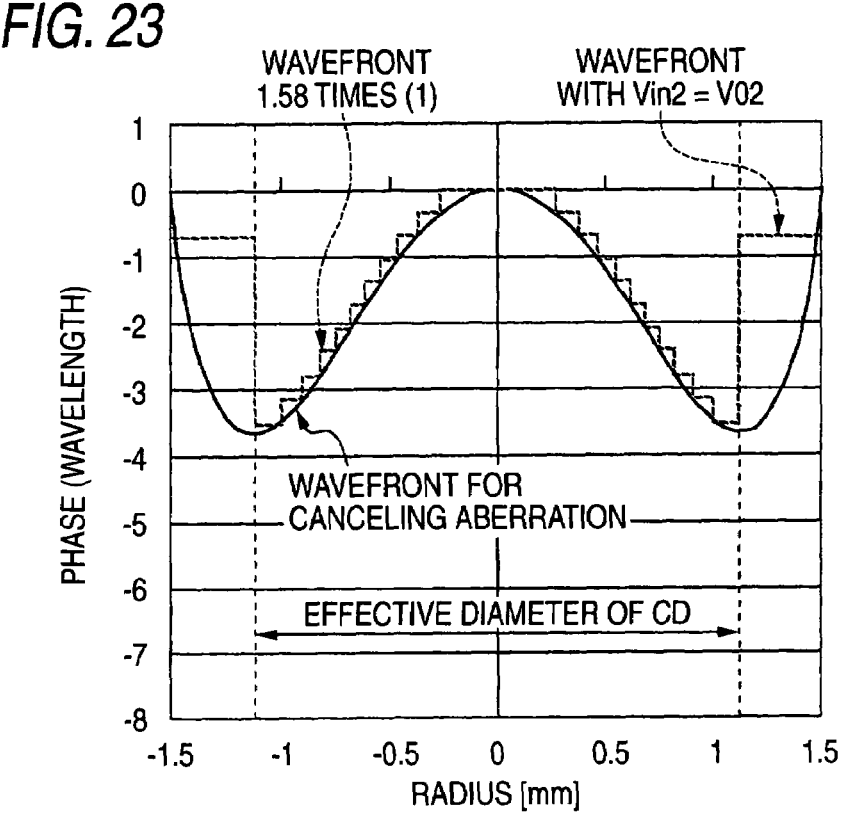
FIG. 23 is a graphical representation showing one example of the penetrated wavefront for CD in a modification of the example 2.
Figure 24:
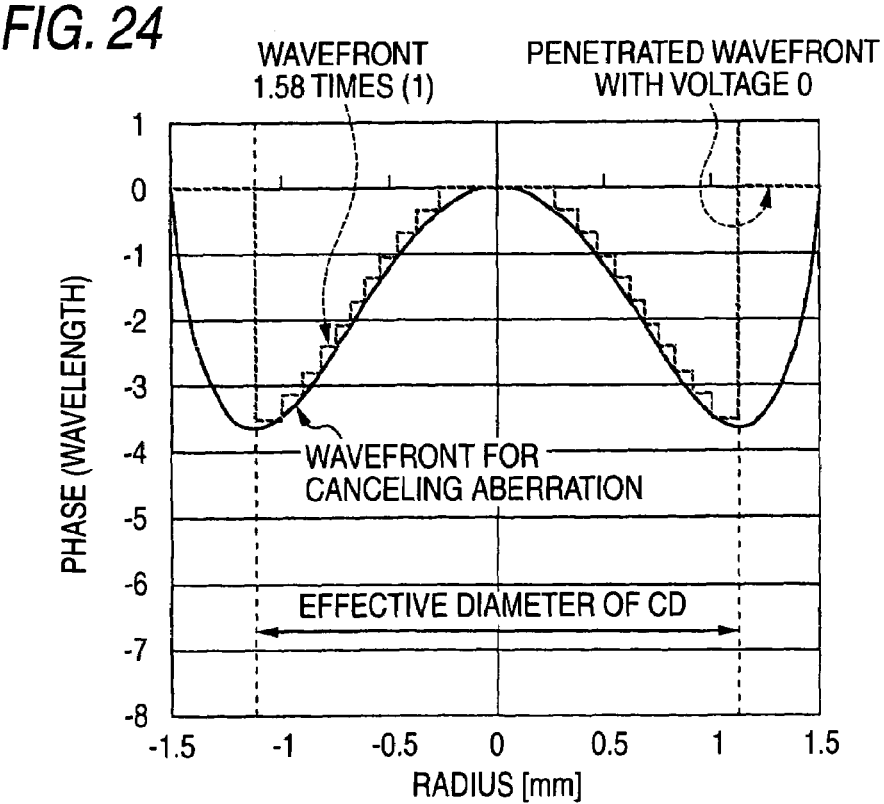
FIG. 24 is a graphical representation showing one example of the penetrated wavefront for CD in a modification of the example 2.

By the way, though the example 2 has been described above, the contents of the example 2 may be practiced in various other ways, besides the above description. For example, in the example 2, the voltage is applied to the electrode Vin2 to have an amplitude ratio of about 0.79, but this invention is not necessarily limited to this form. The voltage may be applied to have an amplitude ratio of about 3.16 as shown in FIG. 22, the voltage equal to the bias voltage of electrode V02 may be applied, as shown in FIG. 23, or a zero voltage may be applied to the electrodes Vin2 and V02, as shown in FIG. 24. That is, in the form in which only the aberration occurring in the area (area A) inside the effective diameter of CD is corrected consequently (the aberration occurring in the area B is not corrected), it does not matter whatever magnitude of voltage is applied to the electrode Vin2.

Also, in the example 2, the BD, DVD and CD are reproduced, but the invention is not necessarily limited thereto. The invention is also applied to the cases where the objective lens exclusively used for a first optical recording medium is employed for a second optical recording medium having a smaller effective diameter than the first optical recording medium and for a third optical recording medium having a smaller effective diameter than the second optical recording medium, such as the AOD, DVD and CD having the specifications as shown in FIG. 11B are reproduced with the AOD objective lens (e.g., focal distance of 2.3 mm, effective diameter of 1.5 mm in radius).

Figure 25:
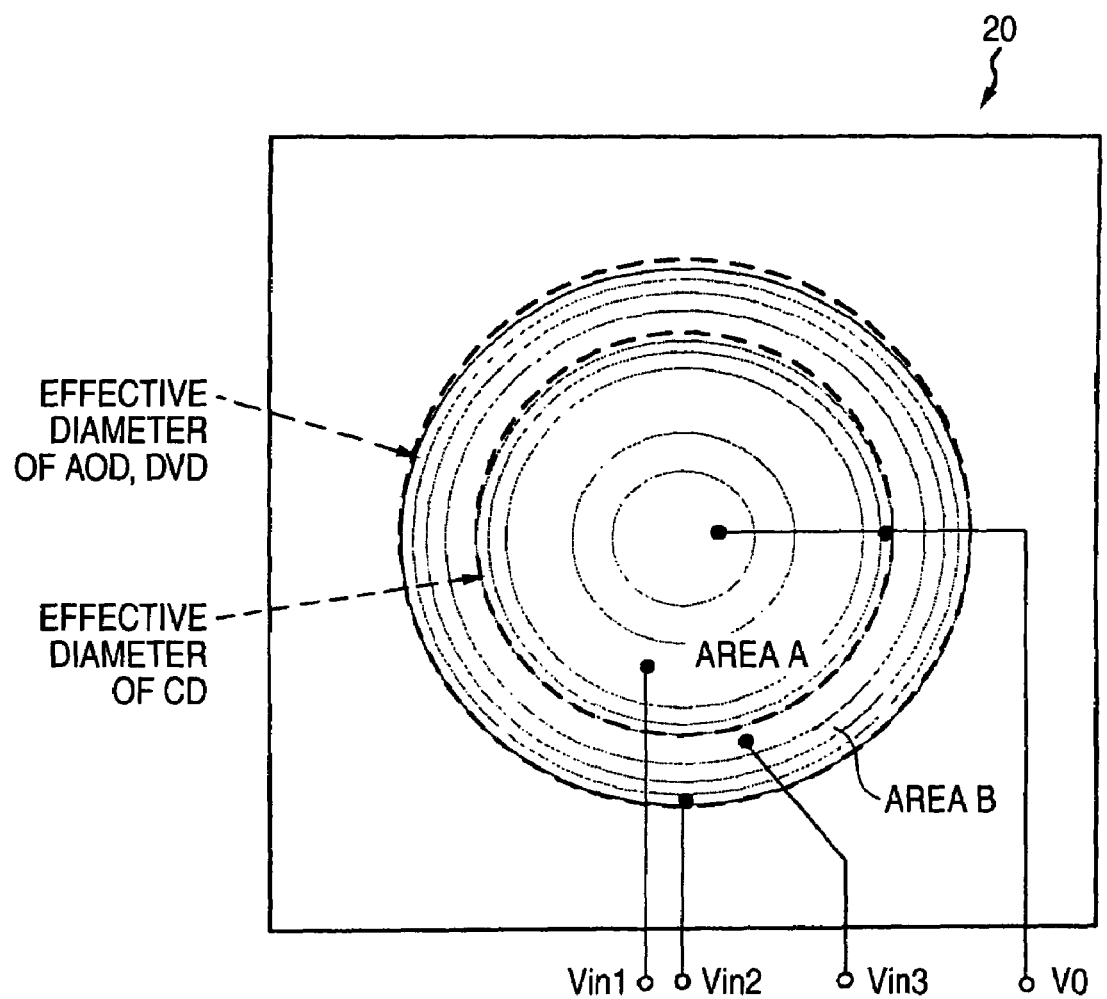
FIG. 25 is a view showing a constitution example of the liquid crystal panel in a modification of the example 2.
Figure 26:
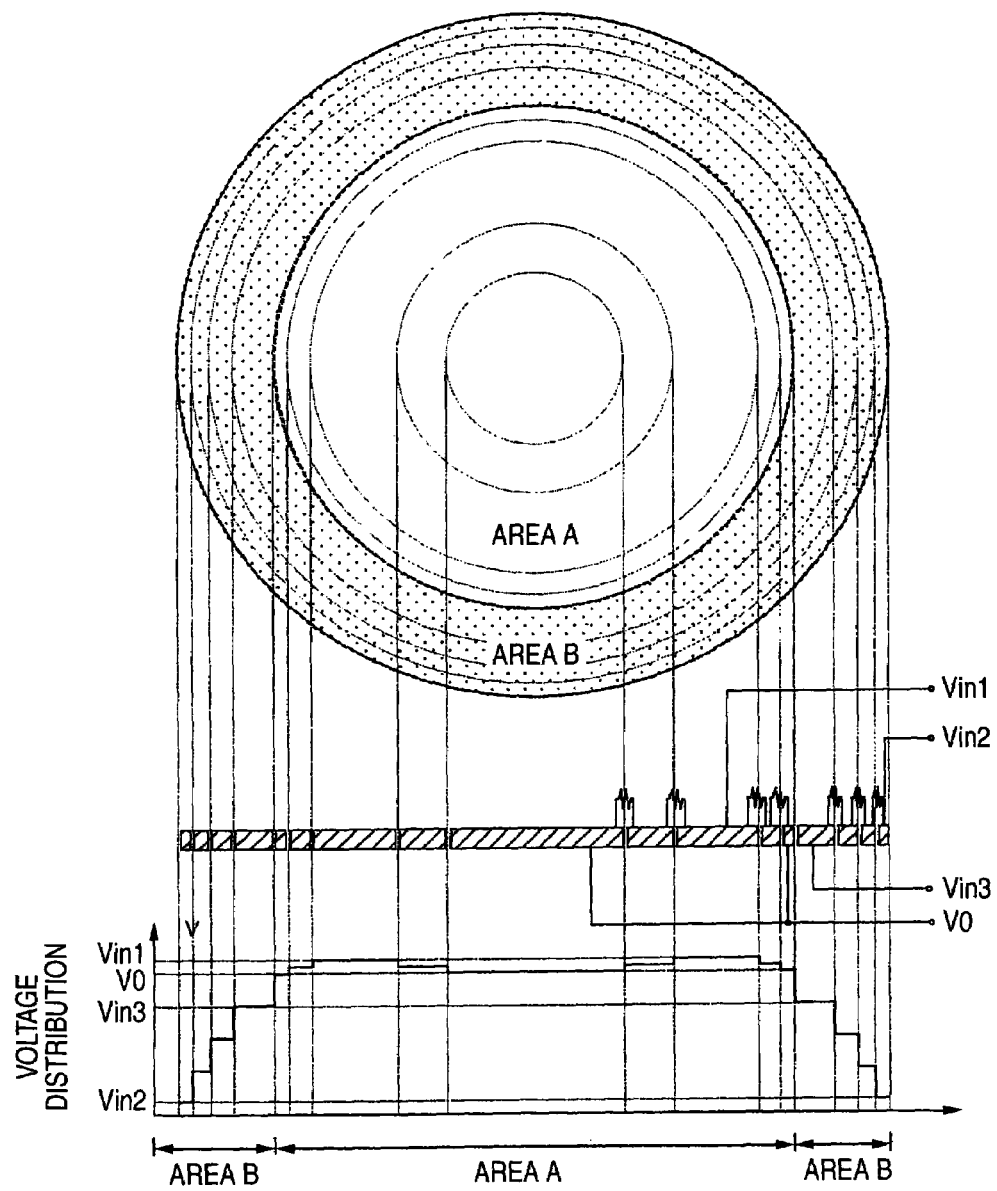
FIG. 26 is a view showing the applied voltage in a modification of the example 2.
Figure 27:
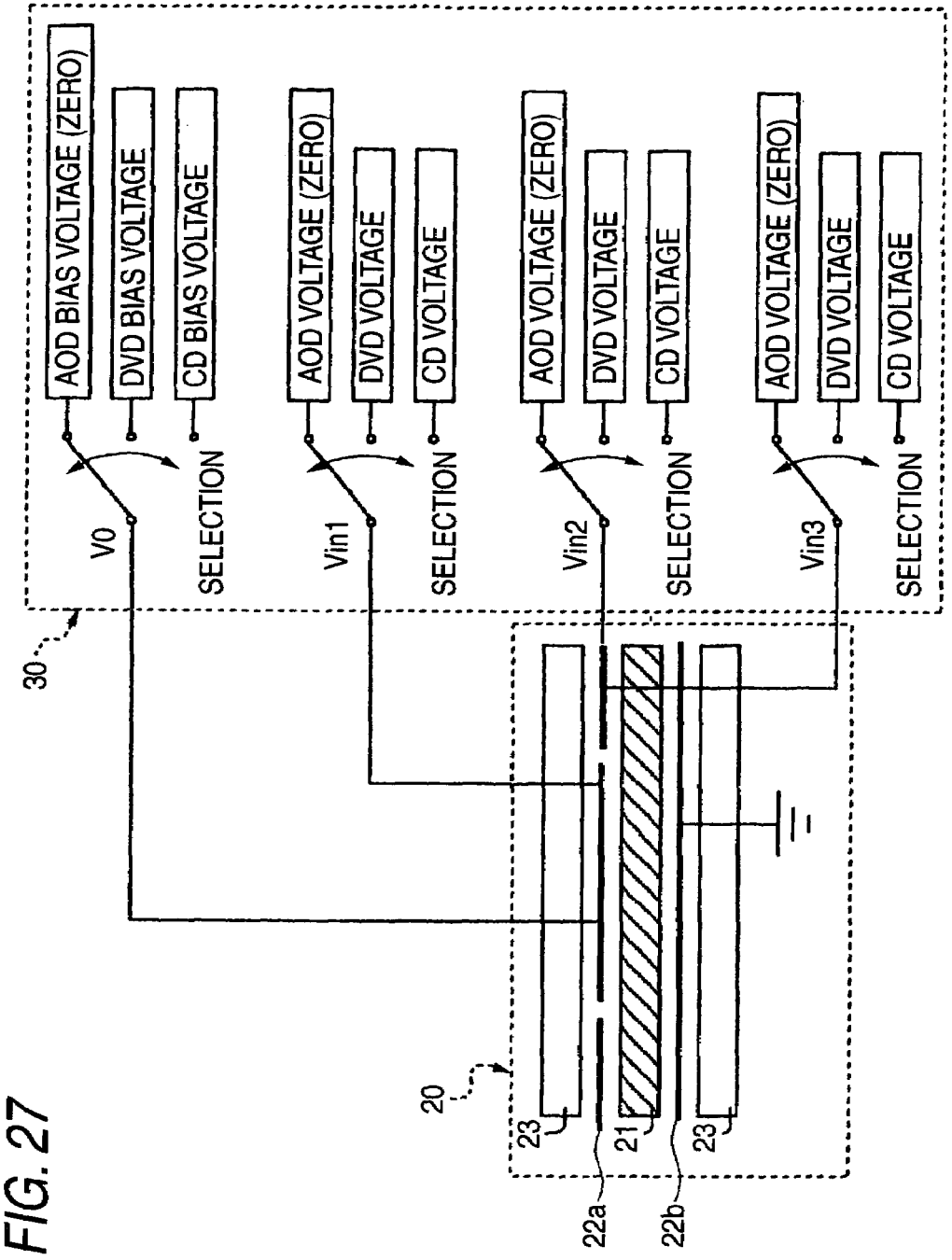
FIG. 27 is a view showing the selection of voltage in a modification of the example 2.
Figure 28:
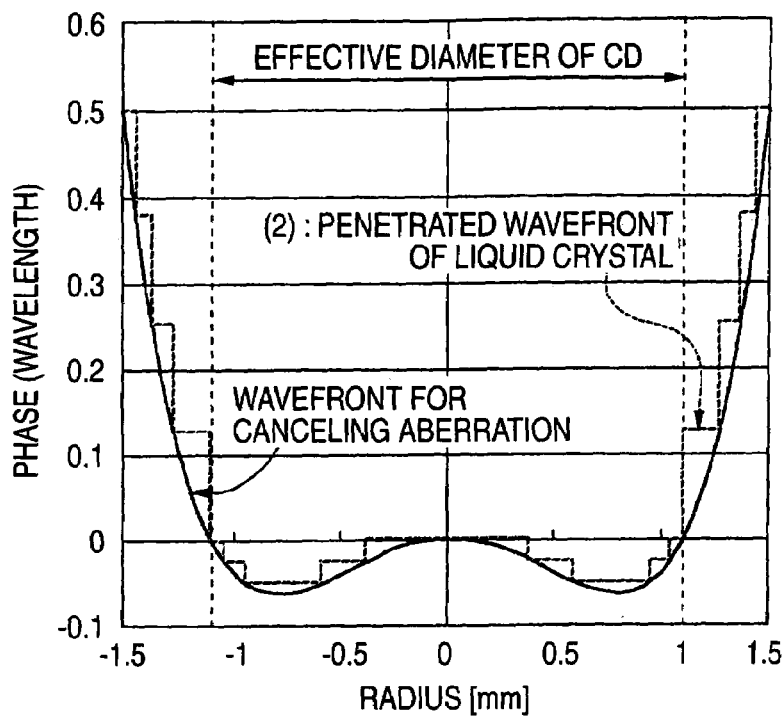
FIG. 28 is a graphical representation showing one example of the penetrated wavefront for DVD in a modification of the example 2.
Figure 29:
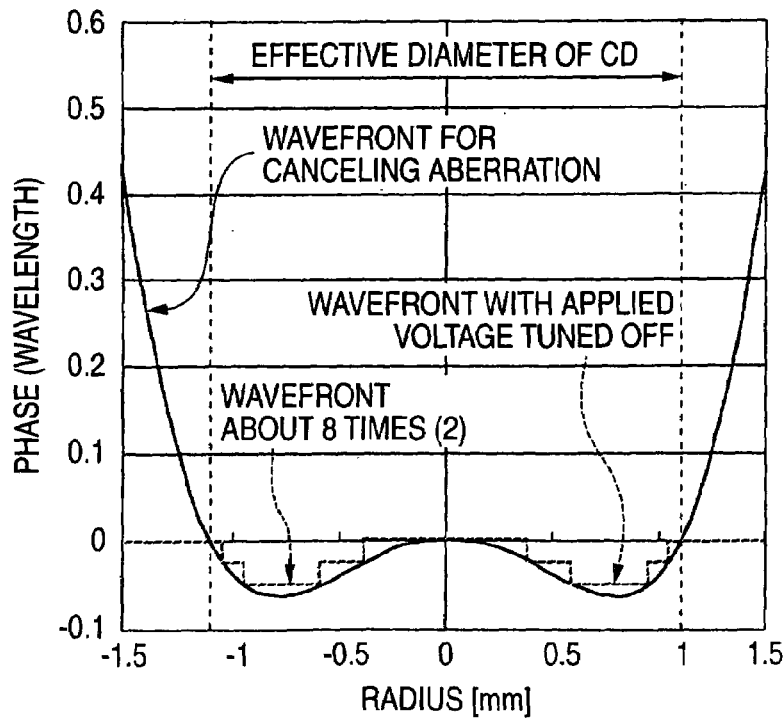
FIG. 29 is a graphical representation showing one example of the penetrated wavefront for CD in a modification of the example 2.

Herein, simply describing a case where the AOD, DVD and CD are reproduced with the AOD objective lens, the liquid crystal panel 20 is constituted as shown in FIGS. 25 and 26, in which the liquid crystal panel control portion 30 switches the magnitude of voltage as shown in FIG. 27. That is, when the DVD is reproduced, voltage is applied to form the "penetrated wavefront having an amplitude corresponding to the aberration occurring in each of the areas A and B", as shown in FIG. 28. On the other hand, when the CD is reproduced, voltage is applied to form the "penetrated wavefront having an amplitude ratio of about 8 to the penetrated wavefront for DVD (see FIG. 28) in the area A but not having an amplitude ratio of about 8 in the area B". As a result, only the aberration occurring in the area inside the effective diameter of each disk is corrected, so that light passing outside the effective diameter of each disk does not contribute to spot formation under the influence of residual aberration, giving rise to substantially the same effect as when the aperture is restricted inside the effective diameter of each disk.

In the example 2, the liquid crystal panel 20 has the electrode pattern of segment type, but is not necessarily limited thereto. The invention may be also applicable to the liquid crystal panel having the electrode pattern of so-called gradation type. Moreover, the constitution of the electrode pattern is only exemplary, but may be also applied as far as the penetrated wavefront is formed.

EXAMPLE 3

Figure 30:
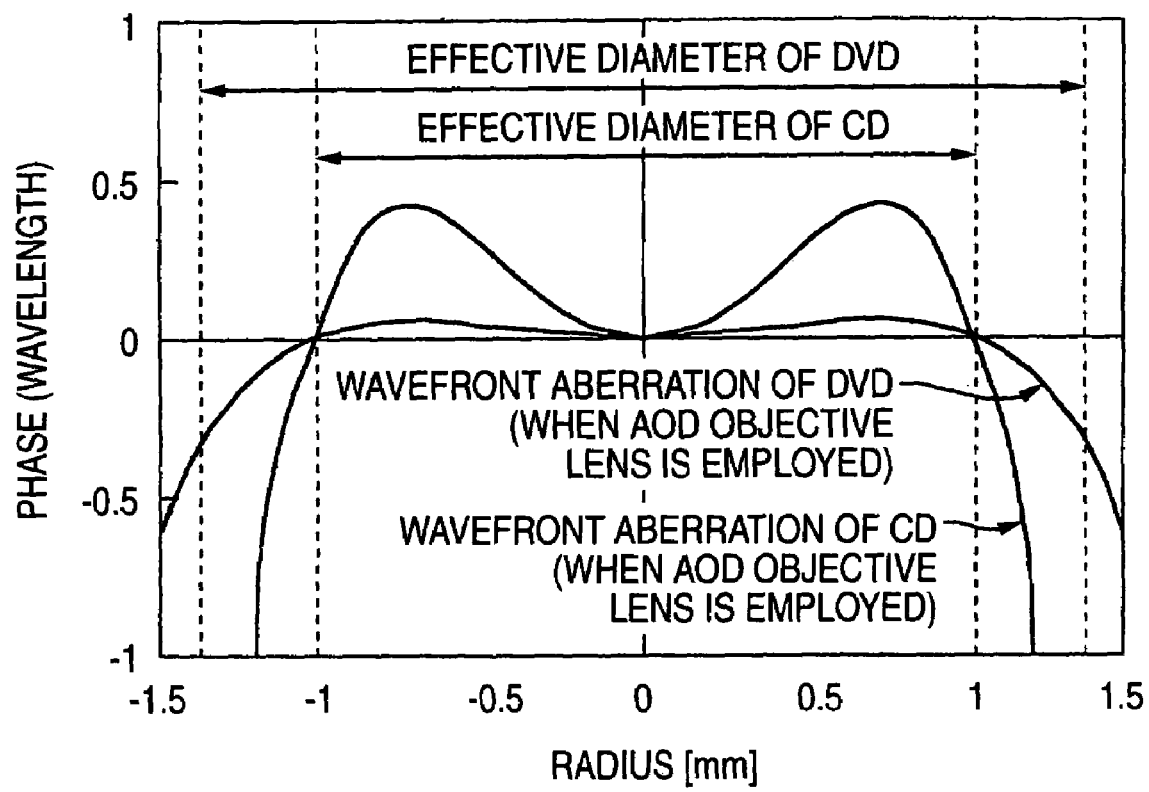
FIG. 30 is a graphical representation showing one example of wavefront aberration corrected in the example 3.

Subsequently, in an example 3, the disk reproducing apparatus 10 for reproducing the AOD, DVD and CD employing an AOD objective lens will be described with reference to FIGS. 30 to 35. That is, though in the above "modification of example 2", the AOD, DVD and CD are reproduced employing the AOD objective lens, further variations of this modification 2 are given in the example 3. Herein, the specifications of each disk are shown in FIG. 11A, in which DVD has an NA of 0.65 larger than normally used NA of 0.60 in view of the recording characteristics. That is, the effective diameters of AOD and DVD are equal in this example. In this example 3, the AOD objective lens is optimized for the AOD (e.g., focal distance of 2.3 mm and effective diameter of 1.5 mm in radius), and only when employed only for the DVD and CD, the wavefront aberration of similar shape occurs in which the radial position of phase zero overlaps in the effective diameter of CD, as shown in FIG. 30.

Figure 31:
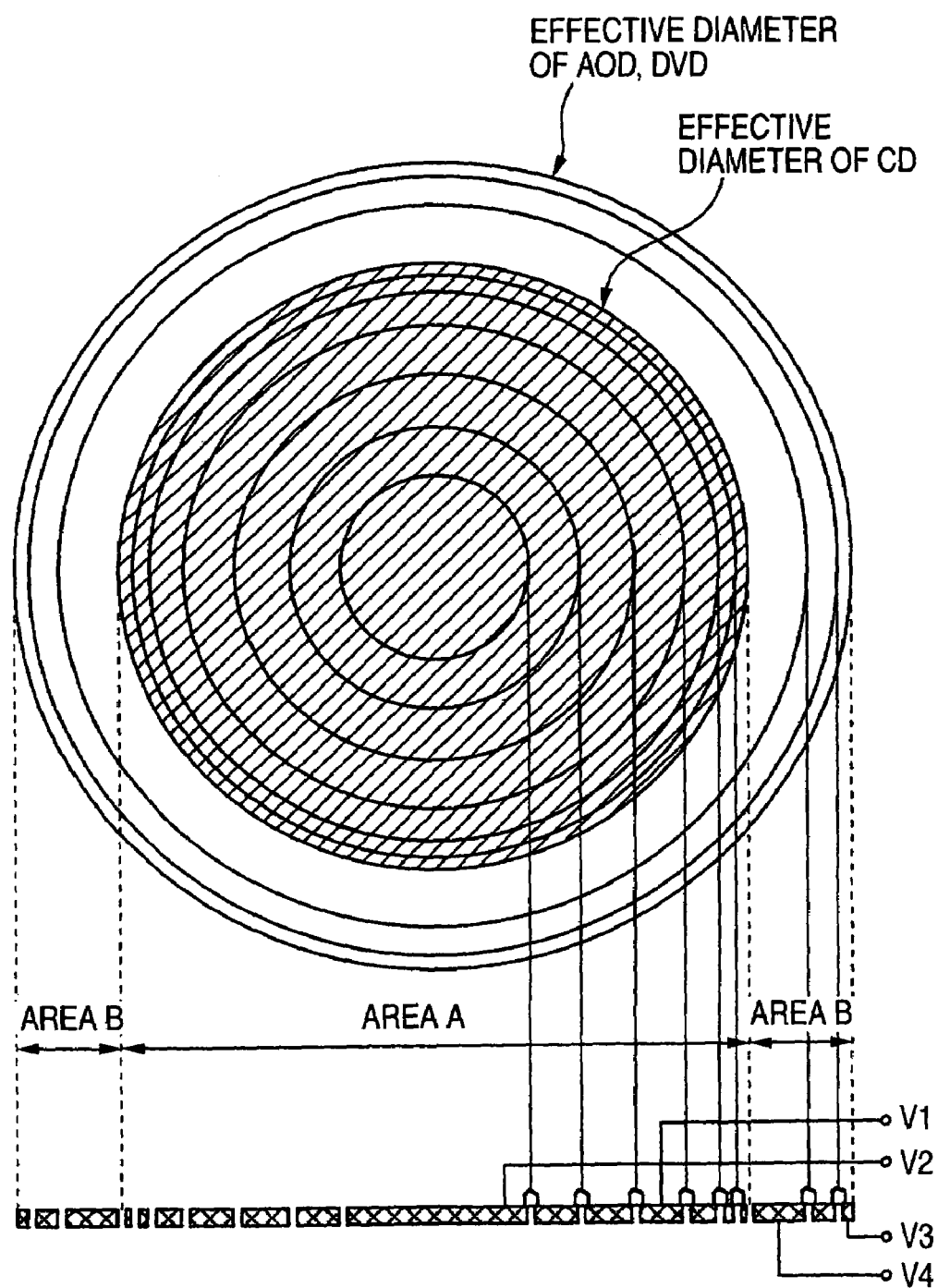
FIG. 31 is a view showing a constitution example of the liquid crystal panel in the example 3.

The liquid crystal panel 20 of the example 3 has an electrode pattern of segment type inside the effective diameter of DVD (AOD), in which the voltage is applied independently from the liquid crystal panel control portion 30 via each of the electrodes (V1, V2, V3, V4) to the area A corresponding to the inside of the effective diameter of CD and the area B corresponding to the inside of the effective diameter of DVD (AOD) and the outside of the effective diameter of CD, as shown in FIG. 31. The reason why the electrode pattern is constituted inside the effective diameter of DVD is that the DVD and CD are disks of correction object.

Figure 32:
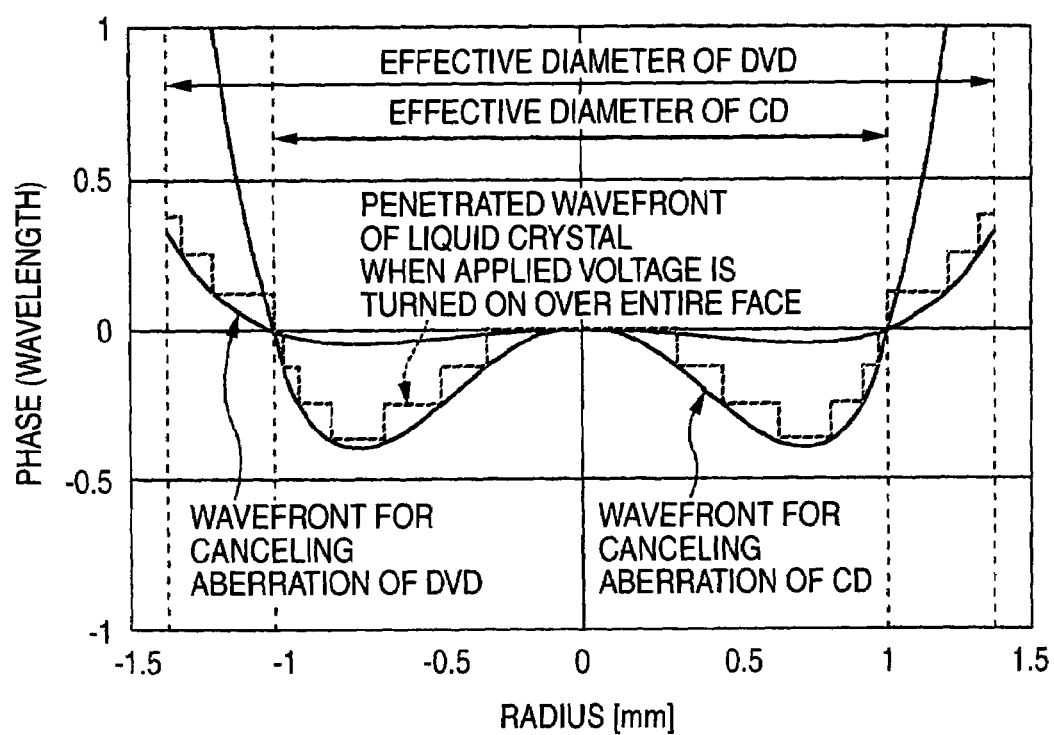
FIG. 32 is a graphical representation showing one example of the penetrated wavefront in the example 3.

Moreover, in this liquid crystal panel 20, the electrode pattern is constituted so that when the voltage of predetermined magnitude (fixed voltage) is applied to each of the electrodes (V1, V2, V3, V4), the penetrated wavefront in reverse phase corresponding to the wavefront aberration occurring when reproducing the CD may be formed in the area A where the electrodes V1 and V2 exist, and the penetrated wavefront in reverse phase corresponding to the wavefront aberration occurring when reproducing the DVD may be formed in the area B where the electrodes V3 and V4 exist, as shown in FIG. 32. Unlike the example 2, the reason why the electrode pattern is not constituted supposing the wavefront aberration of DVD in the area A is that the wavefront aberration occurring in the area A is small enough to be fit without correction (see FIG. 30), and not the correction object. Therefore, the electrode pattern is constituted in the area A, supposing the wavefront aberration of CD.

Figure 33:
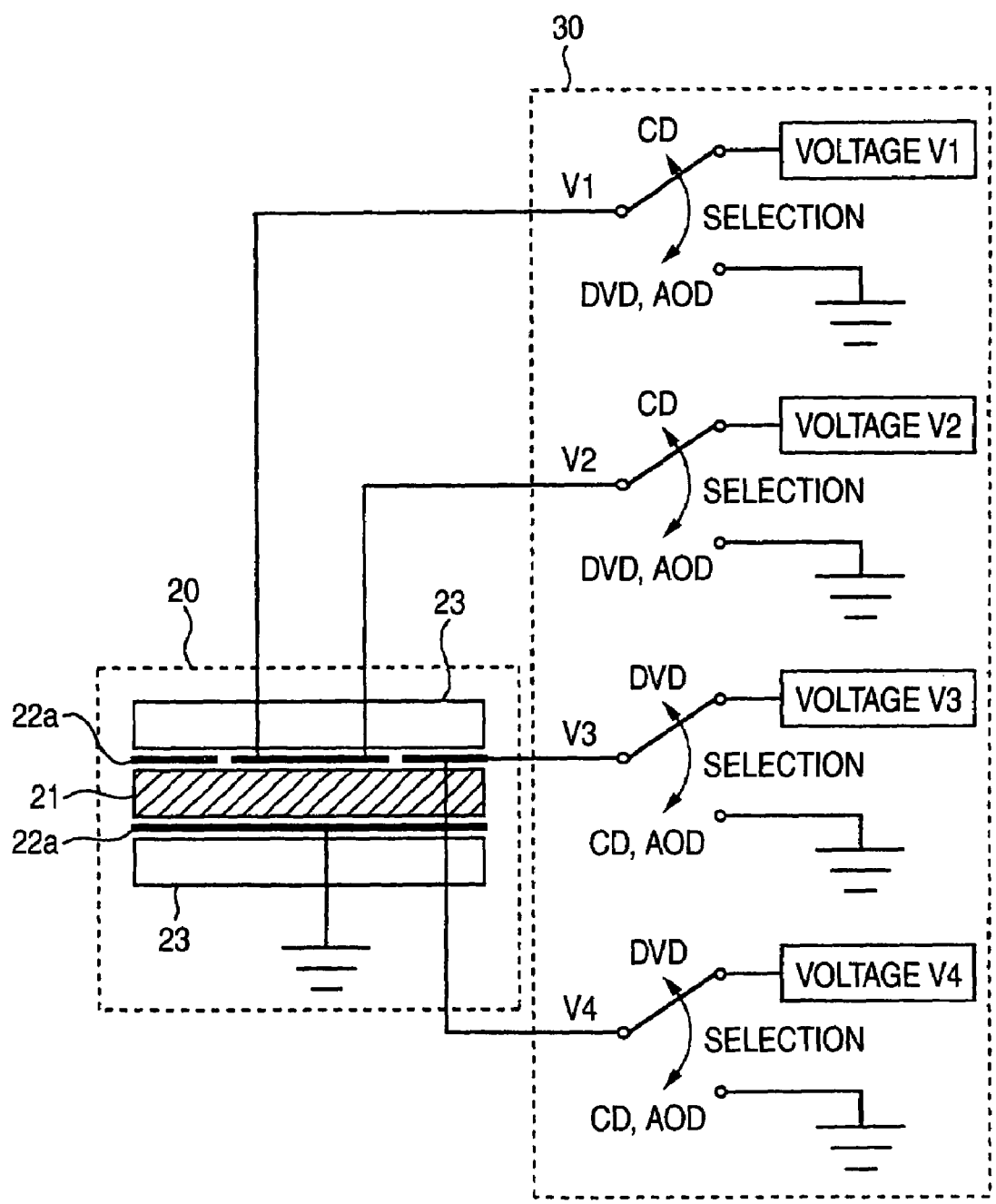
FIG. 33 is a view showing the selection of voltage in the example 3.

The liquid crystal panel control portion 30 of the example 3 selectively switches the magnitude of voltage to be applied to each of the electrodes (V1, V2, V3, V4) of the liquid crystal panel 20 in accordance with the kind of disk (kind information input from the disk discriminating portion 16), as shown in FIG. 33. Since in the example 3, one kind of penetrated wavefront is only formed in the areas A and B, as described above, the voltage is controlled by switching on or off.

More specifically, when the AOD is reproduced, a zero voltage is applied to each of the electrodes (V1, V2, V3, V4) to disable the liquid crystal panel 20 to be operated. Also, when the DVD is reproduced, a zero voltage is applied to the electrodes V1 and V2 to form the "penetrated wavefront having an amplitude corresponding to aberration occurring in each of areas A and B", and the preset fixed voltage is applied to the electrodes V3 and V4, supposing the wavefront aberration occurring in the area B.

Figure 34:
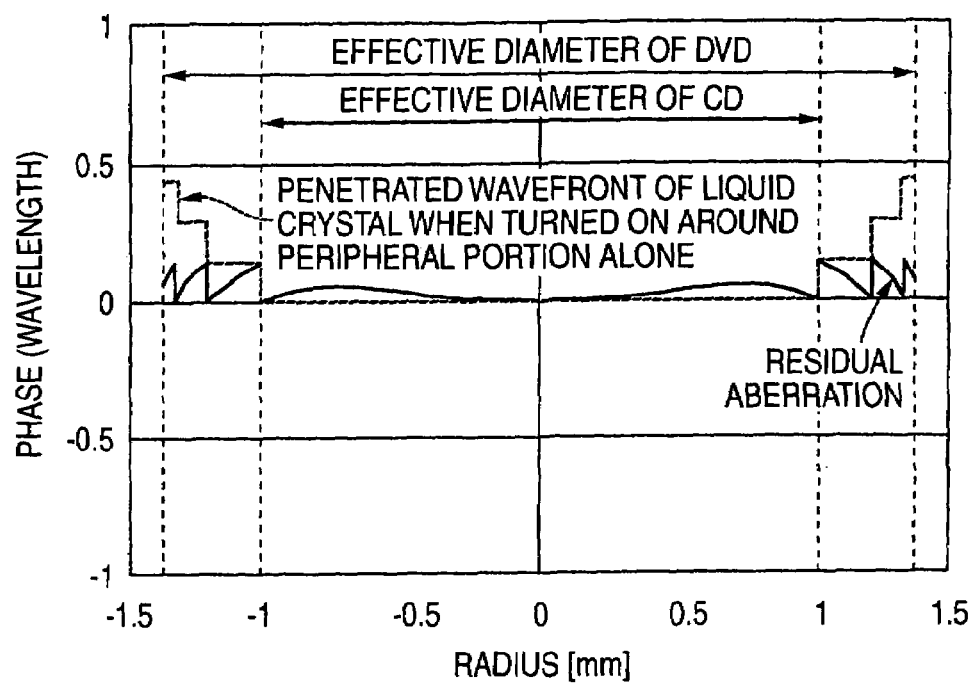
FIG. 34 is a graphical representation showing one example of the penetrated wavefront for DVD in the example 3.

Herein, though no correction is made for the area A, the aberration occurring in this area A is small enough to be fit without correction (see FIG. 30), and as a result of applying the voltage, the residual aberration is sufficiently small in the liquid crystal panel 20, as shown in FIG. 34, whereby the aberration occurring in the areas (areas A and B) inside the effective diameter of DVD is corrected. In this example, the aperture restriction for DVD may be directly made employing the aperture restriction means for AOD, because the effective diameters of DVD and AOD are equal.

On the other hand, when the CD is reproduced, a zero voltage is applied to the electrodes V3 and V4 to form the "penetrated wavefront having an amplitude corresponding to aberration occurring in the area A but not having an amplitude corresponding to aberration occurring in the area B", and the preset fixed voltage is applied to the electrodes V1 and V2, supposing the wavefront aberration occurring in the area A.

Figure 35:
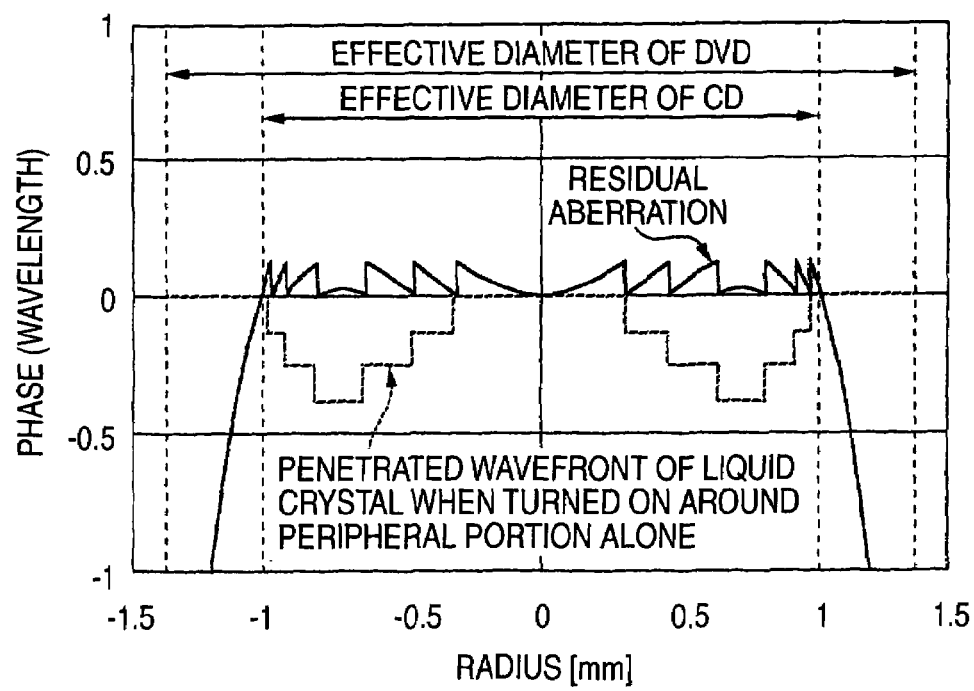
FIG. 35 is a graphical representation showing one example of the penetrated wavefront for CD in the example 3.

As a result, in the liquid crystal panel 20 as shown in FIG. 35, since only the aberration occurring in the area (area A) inside the effective diameter of CD is corrected, the light passing outside the effective diameter of CD does not contribute to spot formation under the influence of residual aberration, giving rise to substantially the same effect as when the aperture is restricted inside the effective diameter of CD.

As described above, in the example 3, for the aberration occurring when the AOD objective lens is employed for DVD and CD, voltage is applied to form the penetrated wavefront having a phase distribution for correcting only the aberration occurring in the area inside the effective diameter of DVD, when the AOD objective lens is employed for DVD, or voltage is applied to form the penetrated wavefront having a phase distribution for correcting only the aberration occurring in the area inside the effective diameter of CD, when the AOD objective lens is employed for CD. Thereby, since the aperture is restricted inside the effective diameter of CD, even when the AOD objective lens is employed for the CD, it is possible to substantially make the aperture restriction only by aberration correction. Also, when the AOD objective lens is employed for the DVD, it is possible to simply produce an excellent beam spot on the signal recording plane in reproducing each disk, because the appropriate aperture restriction is made by the aperture restricting means for AOD.

Also, in the example 3, voltage of any magnitude is applied independently to the area A corresponding to the inside of the effective diameter of CD and the area B corresponding to the outside of the effective diameter of CD and the inside of the effective diameter of DVD, whereby only the amplitude of penetrated wavefront formed in each area is variably controlled. More specifically, when the DVD is reproduced, the voltage of predetermined magnitude is applied to the area B alone to form the penetrated wavefront having an amplitude corresponding to the aberration occurring in the area B. Also, when the CD is reproduced, the voltage of predetermined magnitude is applied to the area A alone to form the penetrated wavefront having an amplitude corresponding to the aberration occurring in the area A. In this way, the aberration correction as well as substantially the aperture restriction can be made by performing the voltage control differently in the areas A and B.

Also, in the example 3, voltage of fixed magnitude is applied to each of the areas A and B. Thereby, there is no need for providing a circuit for switching plural values of voltage to be applied to one electrode, and it is possible to make the simple voltage control only by switching on or off.

Modification of Example 3

By the way, though the example 3 has been described above, the contents of the example 3 may be practiced in various other ways, besides the above description. For example, in the example 3, a zero voltage is applied to each of the electrodes V1 and V2 when the DVD is reproduced, but this invention is not necessarily limited to this form. It does not matter whatever magnitude of voltage is applied to each of the electrodes V1 and V2, as far as the aberration occurring in the areas (areas A and B) inside the effective diameter of DVD is consequently corrected, when voltage of other same magnitude is applied to both the areas A and B. Similarly, when the CD is reproduced, it does not matter whatever magnitude of voltage is applied to each of the electrodes V3 and V4, as far as the aberration occurring in the area (area A) inside the effective diameter of CD is consequently corrected.

In the example 3, the liquid crystal panel 20 has the electrode pattern of segment type, but is not necessarily limited thereto. The invention may be also applicable to the liquid crystal panel having the electrode pattern of so-called gradation type. Moreover, the constitution of the electrode pattern is only exemplary, but may be also applied as far as the penetrated wavefront is formed.

EXAMPLE 4

Subsequently, in an example 4, the disk reproducing apparatus 10 for reproducing the BD, DVD and CD employing the BD objective lens 15 will be described with reference to FIGS. 36 to 42. That is, though in the above "example 2", the BD, DVD and CD are reproduced employing the BD objective lens 15, further variations of the example 2 and its modification are given in the example 4. In the example 4, the BD objective lens 15 is optimized for the BD (e.g., focal distance of 2.35 mm and effective diameter of 2 mm in radius), and only when employed for the DVD and CD, the wavefront aberration of similar shape occurs in which the radial position of phase zero overlaps in the effective diameter of DVD, as shown in FIG. 15A.

Figure 36:
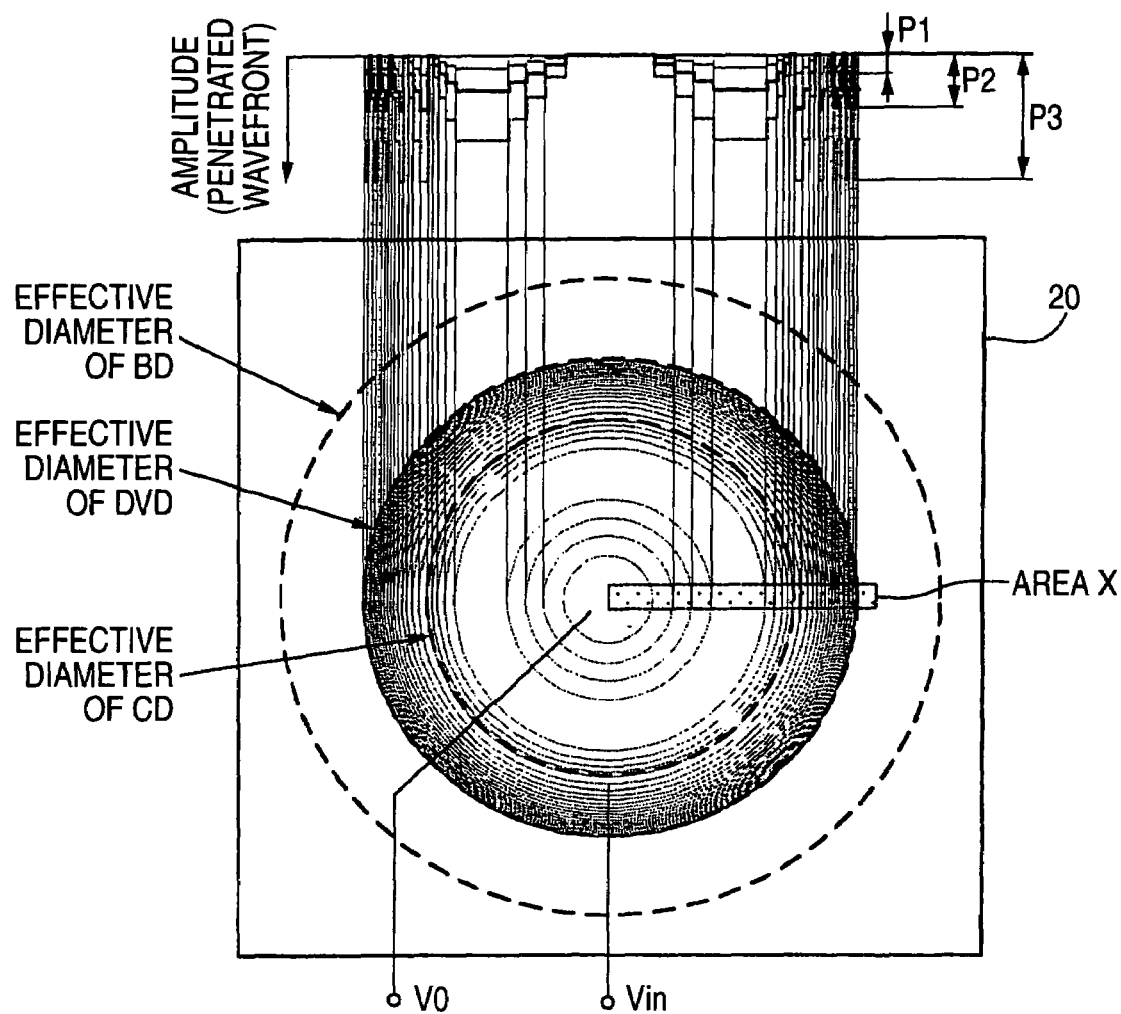
FIG. 36 is a view showing a constitution example of the liquid crystal panel in the example 4.
Figure 37:
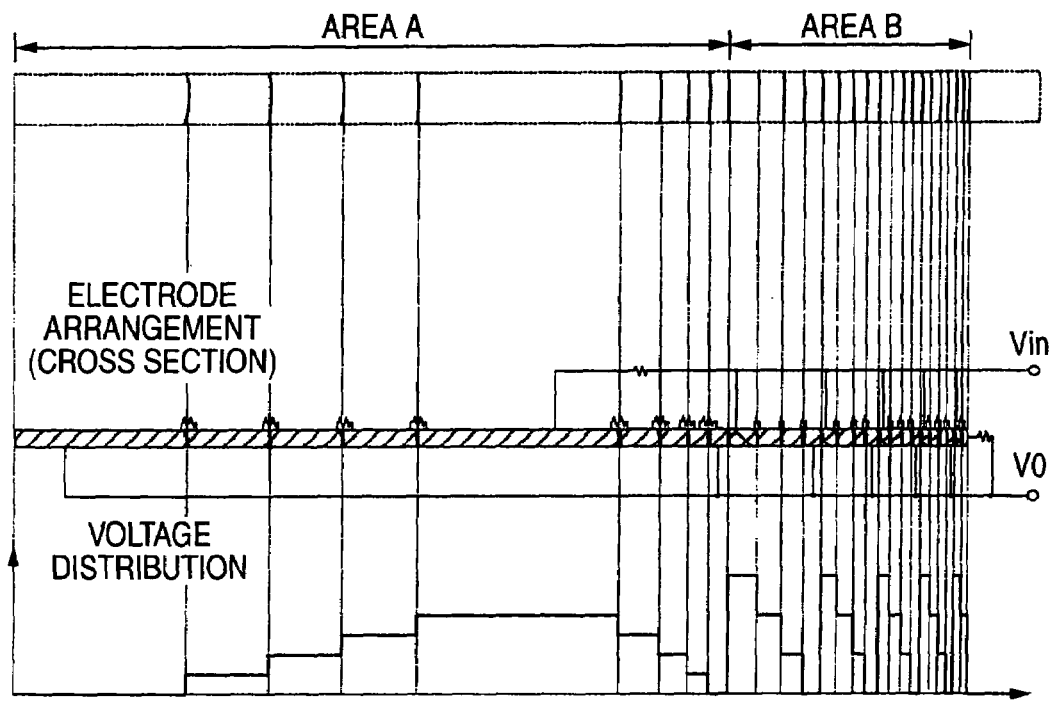
FIG. 37 is a view showing the applied voltage in the example 4.

The liquid crystal panel 20 of the example 4 has an electrode pattern of segment type inside the effective diameter of DVD, in which the voltage of any magnitude is applied integrally from the liquid crystal panel control portion 30 across the electrodes (V0, Vin) to the area A corresponding to the inside of the effective diameter of CD and the area B corresponding to the inside of the effective diameter of DVD and the outside of the effective diameter of CD, as shown in FIG. 36. That is, the liquid crystal panel 20 is constituted such that the voltage of any magnitude is applied to the electrode Vin to be connected at a plurality of radial positions in the areas A and B, while a bias voltage is applied to the electrode V0 to be connected at a plurality of radial positions in the areas A and B, as shown in FIG. 37.

The reason why the electrode pattern is constituted to apply voltage integrally to the areas A and B, unlike the examples 2 and 3, is that the voltage control is made integrally for the areas A and B. That is, this is because only the amplitude of the penetrated wavefront formed in the areas A and B is integrally changed by arbitrarily changing the magnitude of voltage to be applied to the electrode Vin, as shown in FIG. 36.

Moreover, in this liquid crystal panel 20, the electrode pattern is constituted so that when the bias voltage of electrode V0 is the fixed voltage, and the voltage of predetermined magnitude is applied to the electrode Vin, the penetrated wavefront in reverse phase corresponding to the wavefront aberration when reproducing the DVD in the area A and to form the penetrated wavefront the envelop surface of which has a plurality of step differences having a depth of the integral times of wavelength in the area B.

The reason why the electrode pattern is constituted supposing the penetrated wavefront the envelop surface of which has a plurality of step differences having a depth of the integral times of wavelength in the area B, unlike the examples 2 and 3, is that the step difference on the wavefront having a depth of the integral times of wavelength has optically no meaning, and is equivalent to no step difference (aberration is corrected). Moreover, the penetrated wavefront (aberration is not corrected) the envelop surface of which has step differences having a depth of not the integral times of wavelength is formed in the area B only by changing the magnitude of voltage to be applied to the electrode Vin.

Figure 38:
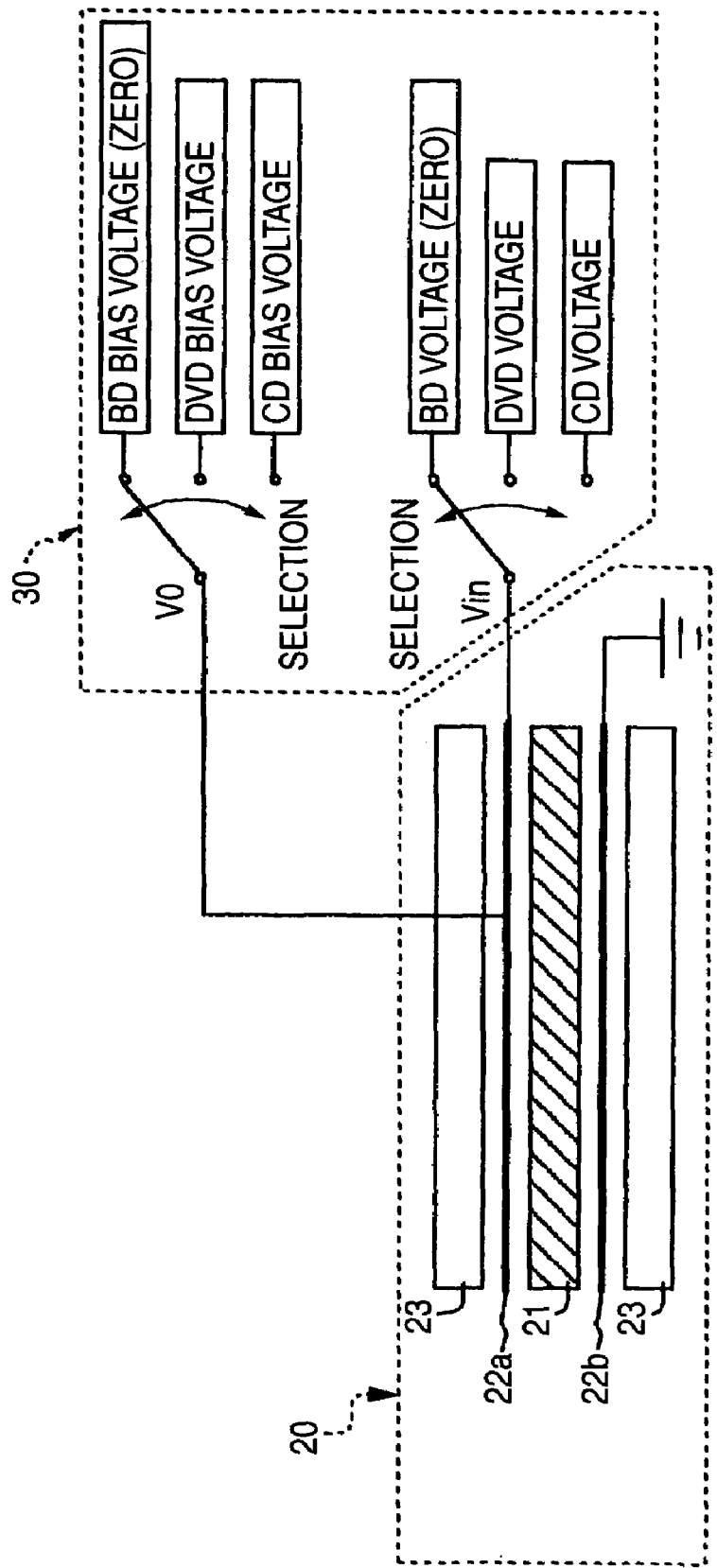
FIG. 38 is a view showing the selection of voltage in the example 4.

The liquid crystal panel control portion 30 of the example 4 selectively switches the magnitude of voltage to be applied to each of the electrodes (V0, Vin) of the liquid crystal panel 20 in accordance with the kind of disk (kind information input from the disk discriminating portion 16), as shown in FIG. 38. More specifically, when the BD is reproduced, a zero voltage is applied to each of the electrodes (V0, Vin) to disable the liquid crystal panel 20 to be operated.

Figure 39:
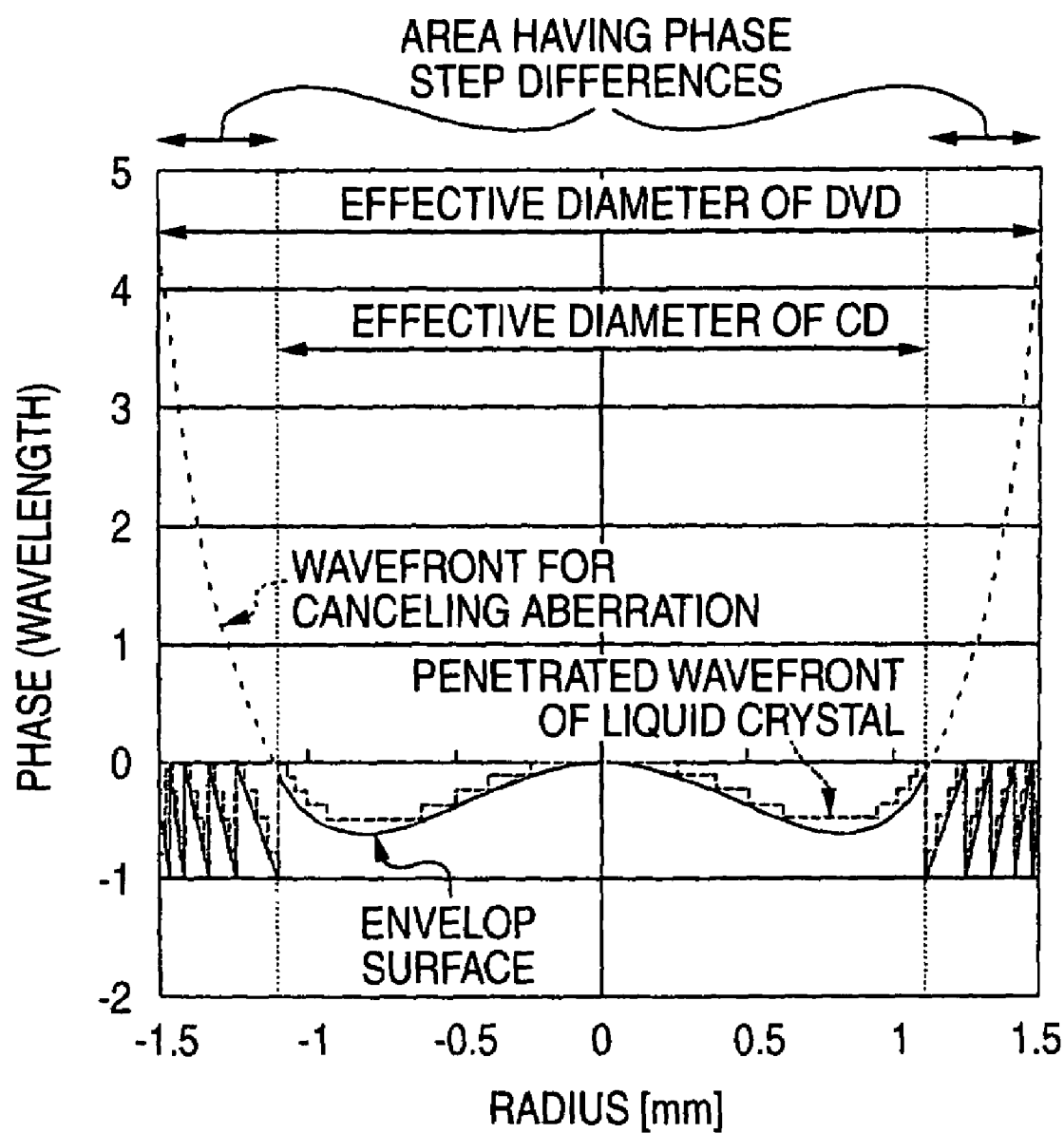
FIG. 39 is a graphical representation showing one example of the penetrated wavefront for DVD in the example 4.

Also, when the DVD is reproduced, voltage is applied to form the "penetrated wavefront having an amplitude corresponding to the aberration occurring in the area A and the penetrated wavefront the envelop surface of which has a plurality of step differences having a depth of the integral times of wavelength in the area B", as shown in FIG. 39. That is, the bias voltage of electrode V0 is the fixed voltage, and the voltage of preset magnitude is applied to the electrode Vin, supposing the penetrated wavefront as above described. In FIG. 39, the envelop surface is optically equivalent to the "wavefront to cancel the aberration".

Figure 40A:
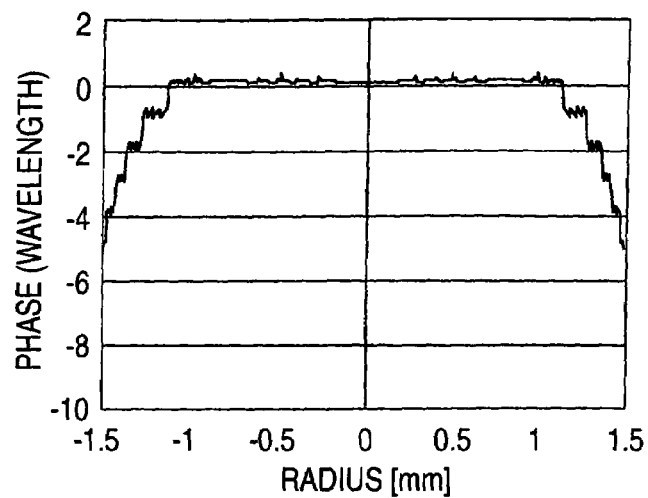
FIGS. 40A to 40C are graphical representations showing the effect of the penetrated wavefront for DVD in the example 4.
Figure 40B:
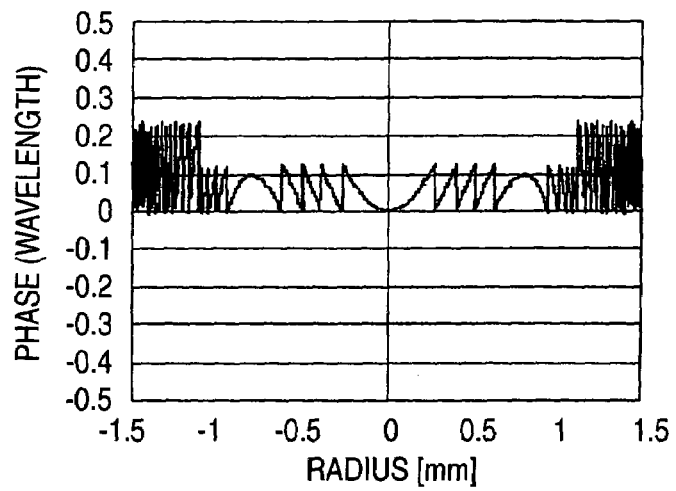
Figure 40C:
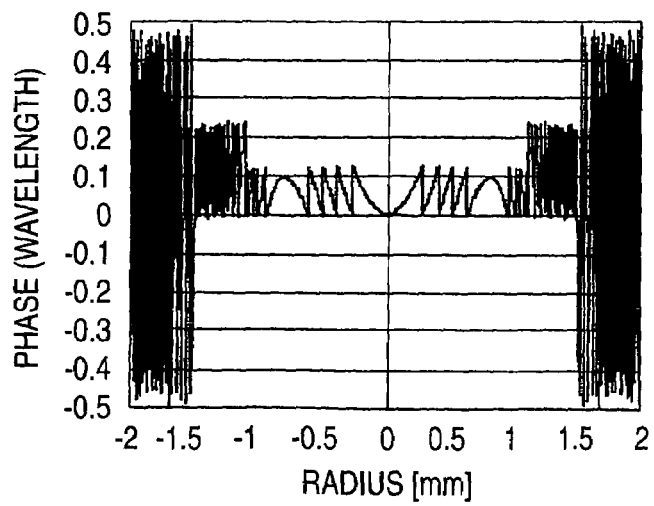

Consequently, in the liquid crystal panel 20, no wavefront aberration occurs in the area A, and stepwise aberration remains in the area B, as shown in FIG. 40A. However, this stepwise aberration has a size of step difference equal to one wavelength, and has optically no meaning, so that the wavefront aberration is equivalently corrected. That is, the residual aberration subtracted by the integral times of wavelength is shown in FIG. 40B, in which the aberration is sufficiently corrected in the areas A and B. On the other hand, the aberration is not corrected and still remains outside the area B, as shown in FIG. 40C. Accordingly, light passing outside the effective diameter of DVD does not contribute to spot formation under the influence of residual aberration, giving rise to substantially the same effect as when the aperture is restricted inside the effective diameter of DVD.

Figure 41:
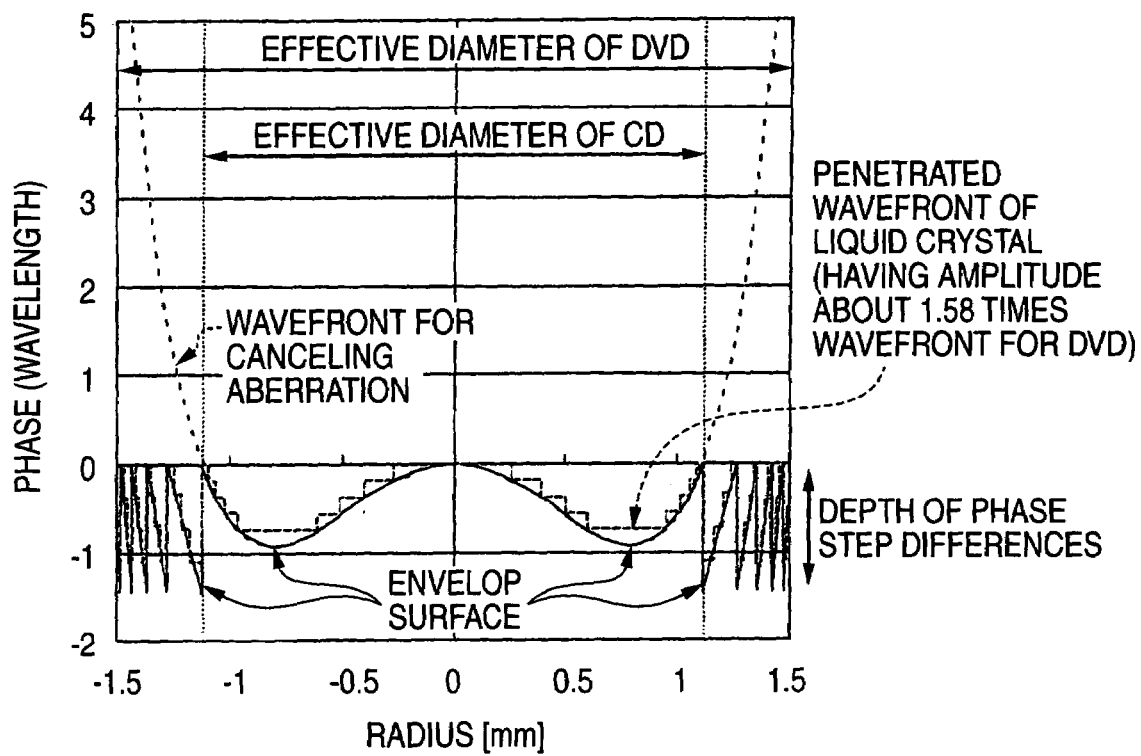
FIG. 41 is a graphical representation showing one example of the penetrated wavefront for CD in the example 4.

On the other hand, when the CD is reproduced, voltage is applied to form the "penetrated wavefront having an amplitude corresponding to the aberration occurring in the area A and the penetrated wavefront the envelop surface of which has a plurality of step differences having a depth of the integral times of wavelength in the area B, as shown in FIG. 41. That is, the voltage of preset magnitude is applied to the electrodes Vin, to attain a predetermined amplitude ratio (about 1.58) to the penetrated wavefront for DVD as above described.

Figure 42A:
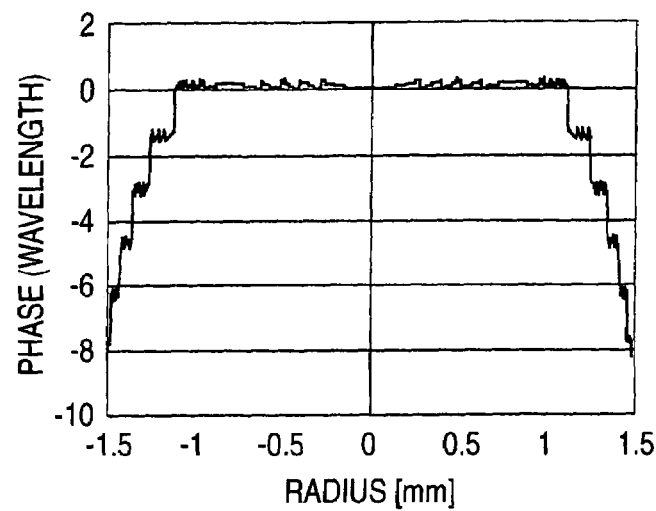
FIGS. 42A to 42C are graphical representations showing the effect of the penetrated wavefront for CD in the example 4.
Figure 42B:
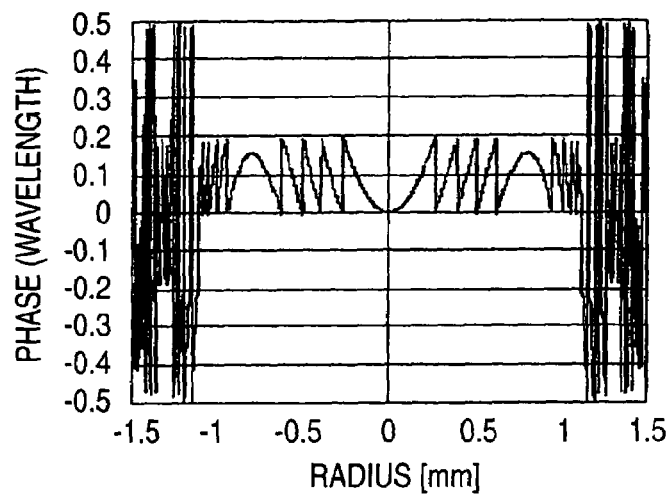
Figure 42C:
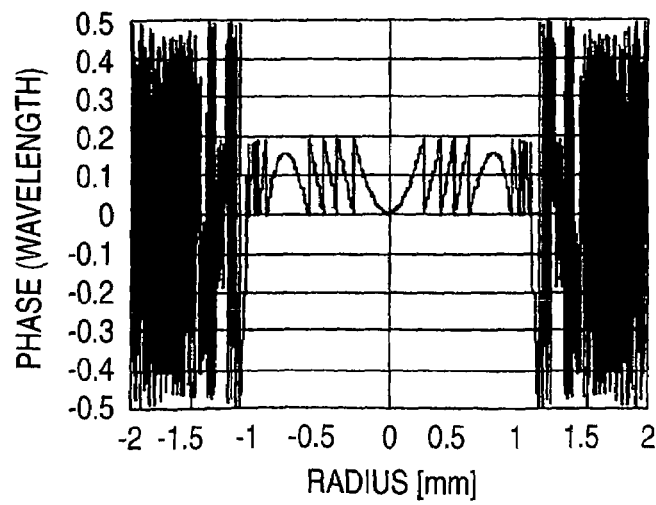

As a result, in the liquid crystal panel 20 as shown in FIG. 42A, no wavefront aberration occurs in the area A, and stepwise aberration remains in the area B. However, this stepwise aberration has a size of step difference unequal to the integral times of wavelength, so that the wavefront aberration is not corrected, unlike the DVD. That is, the residual aberration subtracted by the integral times of wavelength is shown in FIG. 42B, but the aberration is sufficiently corrected in the area A and aberration is not corrected and remains in the area B. Furthermore, aberration is not corrected and still remains outside the area B, as shown in FIG. 42C. Accordingly, light passing outside the effective diameter of CD does not contribute to spot formation under the influence of residual aberration, giving rise to substantially the same effect as when the aperture is restricted inside the effective diameter of CD.

As described above, in the example 4, for the aberration occurring when the BD objective lens 15 is employed for DVD and CD, voltage is applied to form the penetrated wavefront having a phase distribution for correcting only the aberration occurring in the area inside the effective diameter of DVD, when the BD objective lens 15 is employed for DVD, voltage is applied to form the penetrated wavefront having a phase distribution for correcting only the aberration occurring in the area inside the effective diameter of CD. Thereby, since the aperture is substantially restricted inside the effective diameter of DVD and CD, even when the BD objective lens 15 is employed for the DVD and CD, it is possible to make substantially the aperture restriction only by aberration correction and simply produce an excellent beam spot on the signal recording plane in reproducing each disk.

Also, in the example 4, voltage of any magnitude is applied integrally to the area A corresponding to the inside of the effective diameter of CD and the area B corresponding to the outside of the effective diameter of CD and the inside of the effective diameter of DVD, whereby the amplitude of penetrated wavefront formed in each area is variably controlled. More specifically, when the DVD is reproduced, the voltage of predetermined magnitude is applied integrally to the areas A and B to form the penetrated wavefront having an amplitude corresponding to the aberration occurring in the area A and the penetrated wavefront the envelop surface of which has a plurality of step differences having a depth of the integral times of wavelength in the area B. Also, when the CD is reproduced, the voltage of predetermined magnitude is applied integrally to the areas A and B to form the penetrated wavefront having an amplitude corresponding to the aberration occurring in the area A, and the penetrated wavefront the envelop surface of which has a plurality of step differences having a depth of the integral times of wavelength in the area B. In this way, the aberration correction as well as substantially the aperture restriction can be made only by performing the voltage control integrally in the areas A and B. Also, it is unnecessary to constitute the liquid crystal panel 20 having a thickness simply corresponding to the shape of wavefront aberration, whereby the aberration correction and aperture restriction can be performed with the thin liquid crystal panel 20.

Modification of Example 4

By the way, though the example 4 has been described above, the contents of the example 4 may be practiced in various other ways, besides the above description. For example, in the example 4, the penetrated wavefront the envelop surface of which has step differences having a depth of one wavelength in the area B is formed, but this invention is not necessarily limited to this form. It is required that the penetrated wavefront may have the envelop surface having step differences having a depth of the integral times of wavelength, such as two or three wavelengths.

Figure 43:
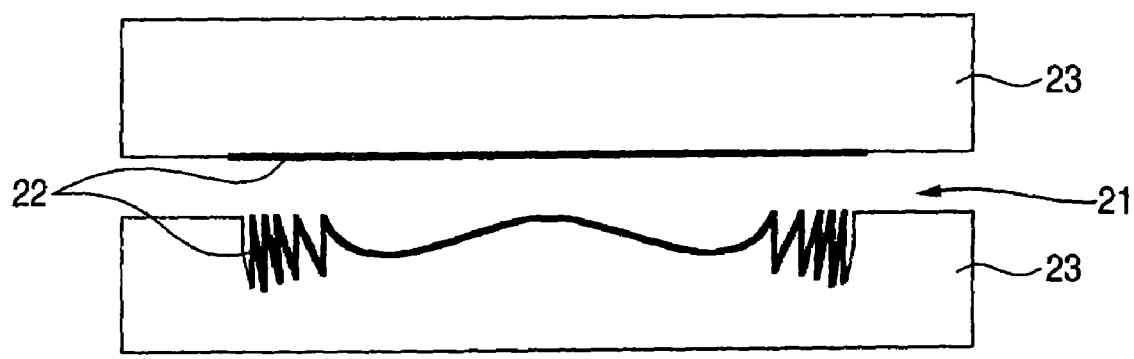
FIG. 43 is a view showing a constitution example of the liquid crystal panel in a modification of the example 4.

Moreover, the penetrated wavefront as desired in the example 4 may be generated by employing the liquid crystal panel in which the thickness of the liquid crystal 21 is changed in accordance with the shape of phase distribution on the desired wavefront, as shown in FIG. 43. That is, in the liquid crystal panel as shown in FIG. 43, the amplitude of penetrated wavefront is only changed by changing the voltage applied to the transparent electrodes 22, whereby the same wavefront as the envelop surface as shown in FIG. 39 or 41 is generated. Accordingly, the same effect as in the example 4 can be obtained employing this liquid crystal panel.

Figure 44:
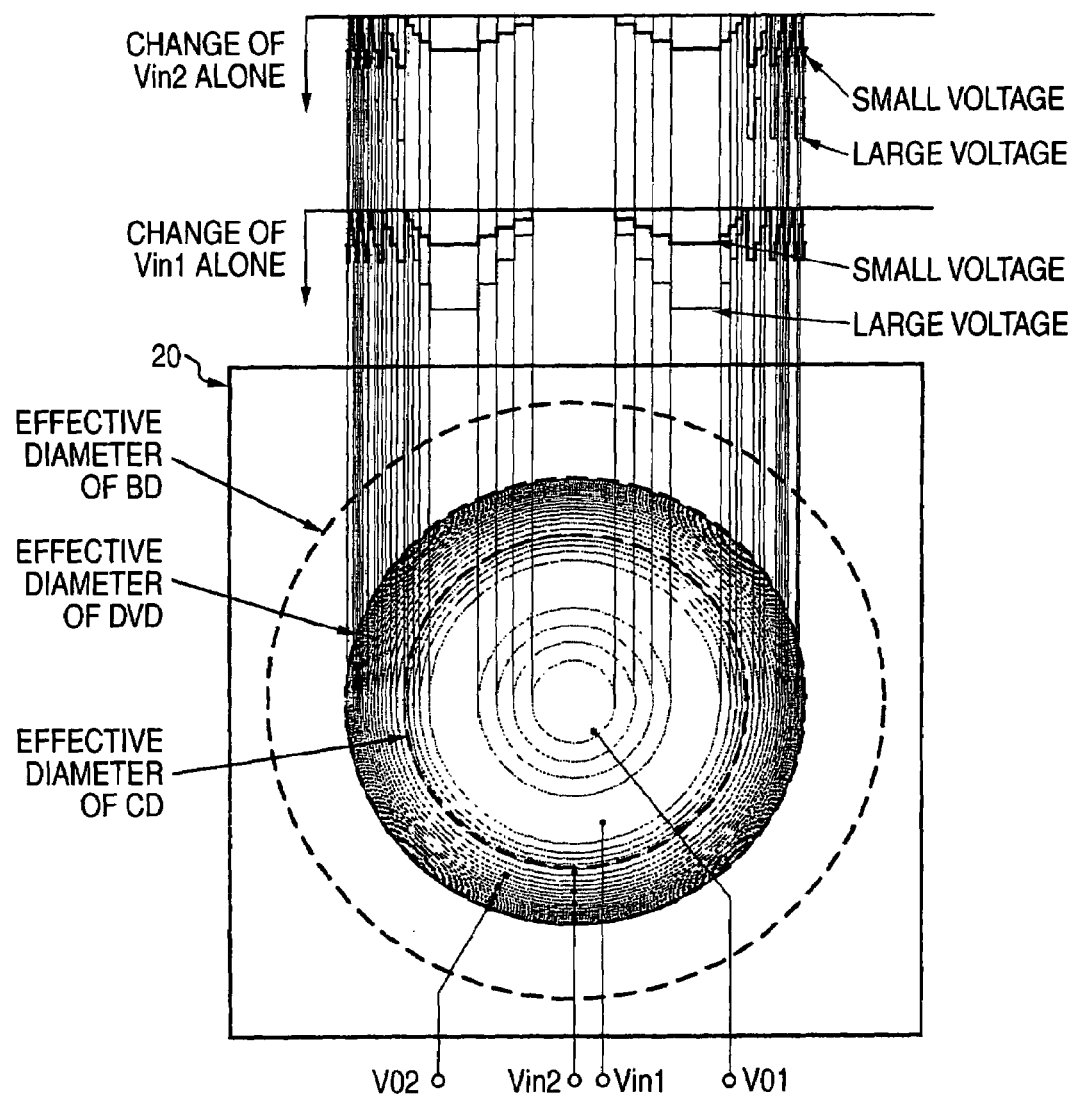
FIG. 44 is a view showing a constitution example of the liquid crystal panel in a modification of the example 4.

Also, in the example 4, voltage of any magnitude is applied integrally to the areas A and B, but the invention is not limited thereto. For example, voltage of any magnitude may be applied independently to the areas A and B, as shown in FIG. 44. More specifically, when the DVD is reproduced, voltage of predetermined magnitude is applied to the area A to form the penetrated wavefront having an amplitude corresponding to the aberration occurring in the area, and voltage of predetermined magnitude is applied to the area B to form the penetrated wavefront the envelop surface of which has a plurality of step differences having a depth of the integral times of wavelength. Also, when the CD is reproduced, voltage of predetermined magnitude is applied to the area A to form the penetrated wavefront having an amplitude corresponding to the aberration occurring in the area A, and voltage of predetermined magnitude is applied to the area B to form the penetrated wavefront the envelop surface of which has a plurality of step differences having a depth of not the integral times of wavelength. In this way, the voltage control is performed differently in the areas A and B, so that the amplitude of penetrated wavefront formed in the area B when reproducing the CD is securely controlled separately from the area A.

By the way, in the above description, a so-called infinite system (incidence of parallel light) in which the aberration correction is made only by changing the voltage of the liquid crystal has been explained, but the aberration of CD may be corrected without changing the voltage in a finite system. That is, in the case of the aberration correction of DVD without changing the voltage, the amount of phase difference on the penetrated wavefront is not changed, but the wavelength (value of λ) is changed. For example, when DVD (use wavelength of 650 nm) has a phase difference of 1λ, CD (use wavelength of 780 nm) has a phase difference of 650/780=0.83λ.

Figure 45:
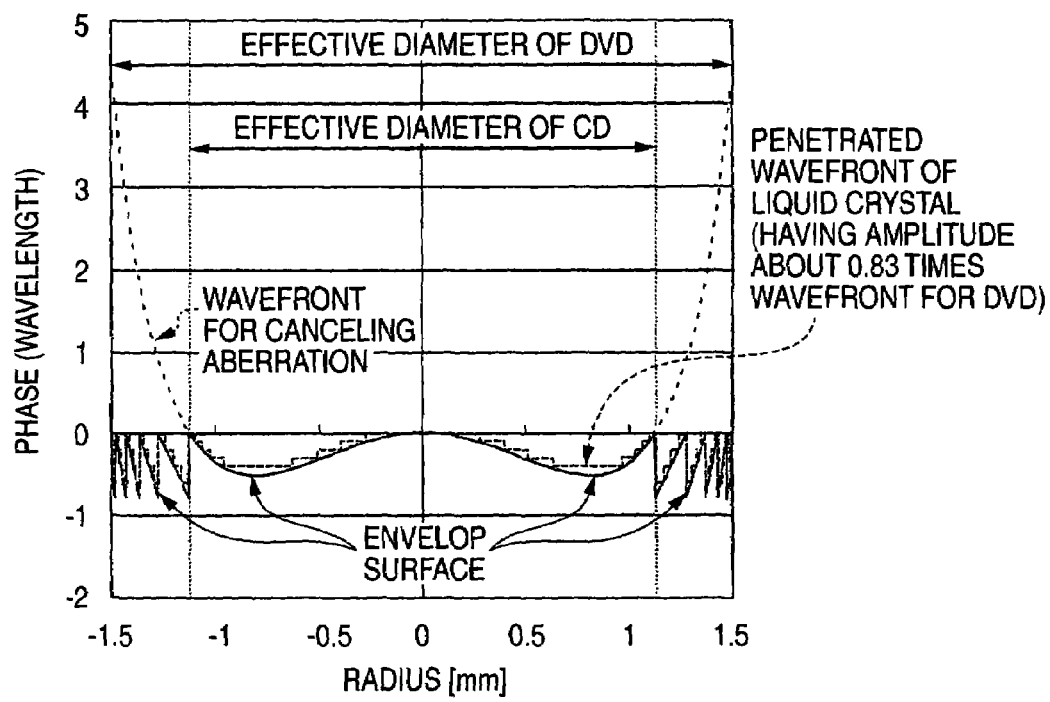
FIG. 45 is a graphical representation showing one example of the penetrated wavefront for CD in a modification of the example 4.

For example, since the penetrated wavefront as shown in FIG. 39 has the wavelength along the longitudinal axis, when the CD system (wavelength of 780 nm) is employed while the voltage is maintained in the same state, the wavefront is 0.83 times in the direction of longitudinal axis, as shown in FIG. 45. When the object distance (distance from the face of objective lens on the light source side to the light source) is 43.3 mm, this wavefront is excellently matched with the wavefront required to cancel the aberration inside the effective diameter of CD, as shown in FIG. 45, whereby it will be found that the aberration is corrected on this penetrated wavefront.

Figure 46A:
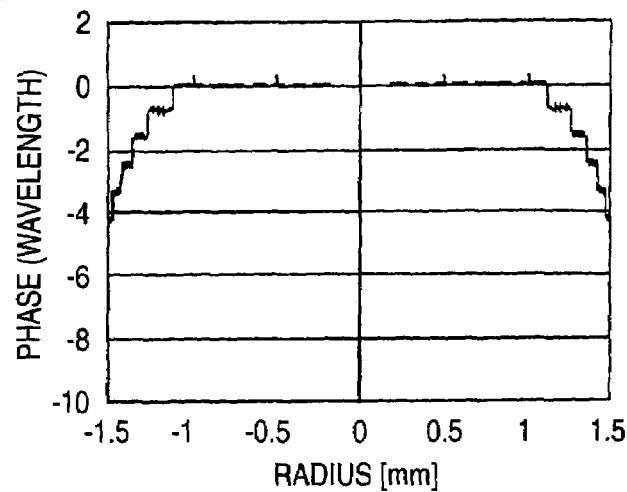
FIGS. 46A to 46C are graphical representations showing the effect of the penetrated wavefront for CD in a modification of the example 4.
Figure 46B:
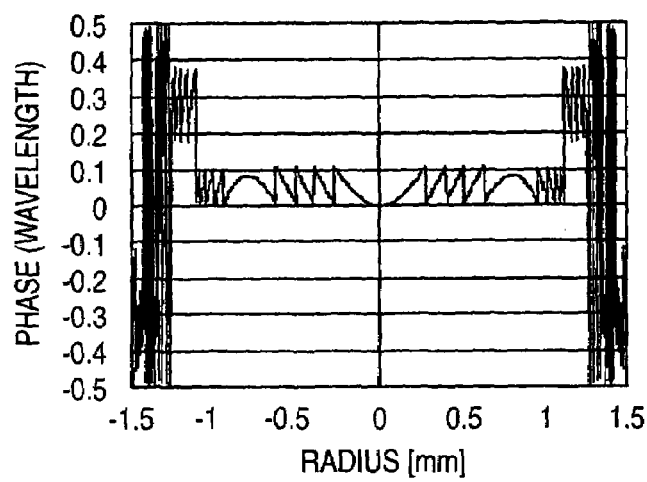
Figure 46C:
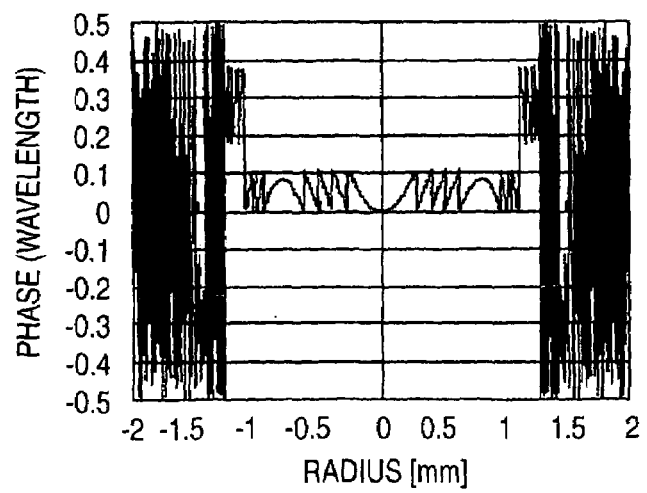

In this case, in the liquid crystal panel 20, the wavefront aberration is eliminated in the area A, but the aberration having step differences having a depth of not the integral times of wavelength remains in the area B, whereby the wavefront aberration is not corrected, as shown in FIG. 46A. That is, FIG. 46B shows the residual aberration subtracted by the integral times of wavelength, in which the aberration is sufficiently corrected in the area A, but the aberration is not corrected and still remains in the area B. Further, the aberration is not corrected and still remains outside the area B, as shown in FIG. 46C. Accordingly, light passing outside the effective diameter of CD does not contribute to spot formation under the influence of residual aberration, giving rise to substantially the same effect as when the aperture is restricted inside the effective diameter of CD.

Figure 47:
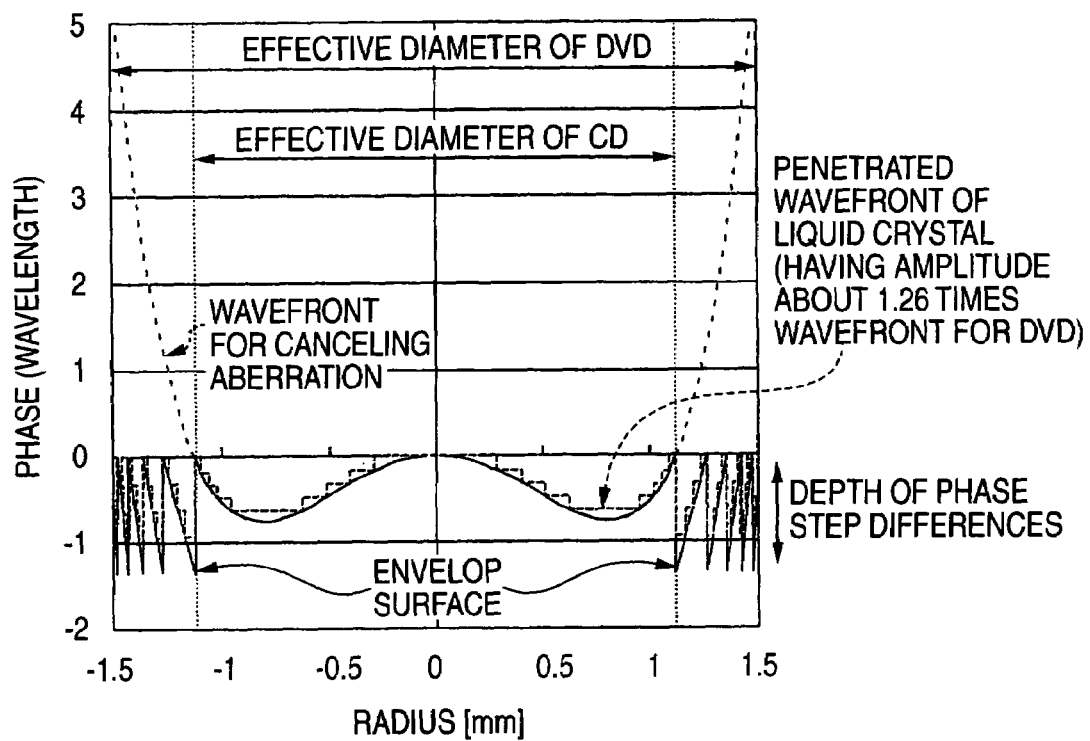
FIG. 47 is a graphical representation showing one example of the penetrated wavefront for CD in a modification of the example 4.

In this way, the aberration correction of CD is made without changing the voltage in the finite system, but may be made by changing the voltage in the finite system. That is, FIG. 47 shows the wavefront required to cancel the aberration when the object distance is 100 mm and the wavefront having the amplitude of penetrated wavefront for DVD that is about 1.26 times. In this case, both the wavefronts are excellently matched inside the effective diameter of CD, whereby it will be found that the aberration is corrected on this penetrated wavefront.

Figure 48A:
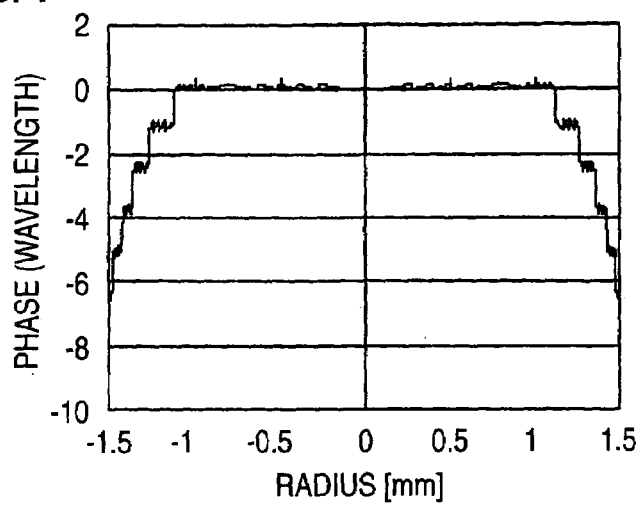
FIGS. 48A to 48C are graphical representations showing the effect of the penetrated wavefront for CD in a modification of the example 4.
Figure 48B:
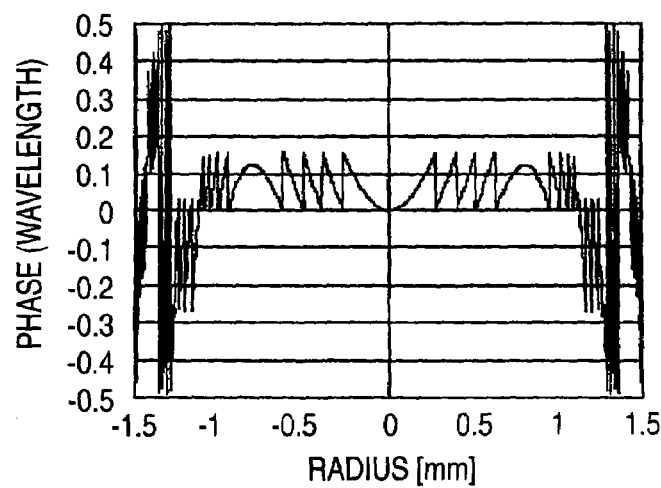
Figure 48C:
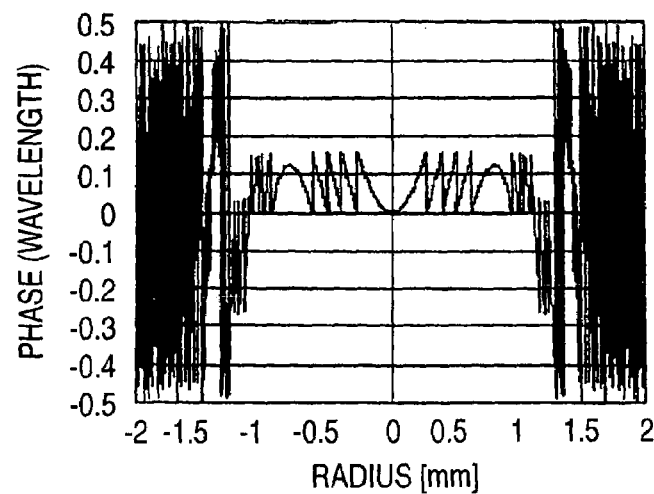

That is, in the liquid crystal panel 20, the wavefront aberration is eliminated in the area A, but the aberration having step differences having a depth of not the integral times of wavelength remains in the area B, whereby the wavefront aberration is not corrected, as shown in FIG. 48A. That is, FIG. 48B shows the residual aberration subtracted by the integral times of wavelength, in which the aberration is sufficiently corrected in the area A but the aberration is not corrected and still remains in the area B. Further, the aberration is not corrected and still remains outside the area B, as shown in FIG. 48C. Accordingly, light passing outside the effective diameter of CD does not contribute to spot formation under the influence of residual aberration, giving rise to substantially the same effect as when the aperture is restricted inside the effective diameter of CD.

Therefore, even if the phase step differences of the envelop surface outside the effective diameter of CD happen to be the integral times of wavelength when the aberration is corrected simply by changing the voltage, or when the aberration is corrected simply by changing the object distance, the size of phase step difference is securely placed out of the integral times of wavelength by appropriately combining the voltage change and the object distance change as described above.

In the example 4, the BD, DVD and CD are reproduced, but the invention is not necessarily limited thereto. The invention is similarly applied as far as the objective lens exclusively used for the first optical recording medium is employed for the second optical recording medium having a smaller effective diameter than the first optical recording medium and for the third optical recording medium having a smaller effective diameter than the second optical recording medium, such as when the AOD, DVD and CD having the specifications as shown in FIGS. 11A and 11B are reproduced with the AOD objective lens (e.g., focal distance is 2.3 mm and the effective diameter is 1.5 mm in radius).

In the example 4, the liquid crystal panel 20 has the electrode pattern of segment type, but the invention is not necessarily limited to the gradation type. The invention is also applicable to the liquid crystal panel having the electrode pattern of so-called gradation type. Moreover, the constitution of the electrode pattern is only exemplary, but may be also applied as far as the above penetrated wavefront is formed.

Other Embodiment

By the way, the embodiment and the examples have been described above, but those contents may be practiced in other embodiment. For example, any penetrated wavefront is formed by applying voltage to the liquid crystal panel 20 in the above description, but the invention is not necessarily limited thereto. The above contents may be also applied as far as any penetrated wavefront is formed by variably controlling the refractive index of the refractive index varying medium the refractive index of which is variably controlled.

Also, in the above description, a variety of electrode patterns are formed on one transparent electrode layer 22a of the liquid crystal panel 20, but the invention is not necessarily limited thereto. For example, the above contents are similarly applied to the case where the electrode pattern is constituted on the transparent electrode layer 22b but not the transparent electrode layer 22a, and the case where it is constituted on both the transparent electrodes 22a and 22b (for example, the transparent electrode layer 22a constituted for DVD and the transparent electrode layer 22b constituted for CD are switched on or off). The wavefront aberration may be corrected by the transparent electrode layer 22a, and other aberrations (e.g., comma aberration) may be corrected by the transparent electrode layer 22b.

Also, in the above description, the penetrated wavefront is differently formed by making the voltage control differently in the examples 1 to 4, but the invention is not necessarily limited thereto. For example, in one disk reproducing apparatus 10 for reproducing a plurality of disks, the voltage control of the example 1 is performed for a certain group of disks, but the voltage control of the example 2 is performed for the other group of disks, whereby the contents of the examples may be combined in one disk reproducing apparatus 10.

The processing procedure, control procedure, specific names, and the information containing various kinds of data or parameters as shown in the description or drawings may be changed at will unless specifically noted. Also, the components of the apparatus as illustrated are functional or conceptual, but may not be necessarily constituted physically as illustrated in the figures. Moreover, each of the processing functions performed in the apparatus as illustrated may be implemented totally or partly by the CPU or a program analyzed or executed by the CPU, or as the hardware with wired logic.

What is claimed is:

1. An aberration correcting device which corrects an aberration occurring when one objective lens is employed for a plurality of optical recording media at least one of recording density and thickness of a cover layer of which is different from each other, comprising: a liquid crystal element disposed between the objective lens and a light source and controlled a refractive index thereof to be varied in accordance with an applied voltage; and a voltage applying portion for applying voltage to the liquid crystal element so that a wavefront of light penetrated through the liquid crystal element forms a penetrated wavefront having a predetermined phase distribution, wherein the voltage applying portion applies voltage so that a penetrated wavefront having a phase distribution for correcting only an aberration occurring in an area inside an effective diameter in recording or reproducing the optical recording medium is formed, wherein the voltage applying portion independently applies predetermined voltage to each of a plurality of electrodes arranged along the liquid crystal element to variably control a shape of the penetrated wavefront, in which the voltage applying portion applies predetermined voltage to a plurality of electrodes arranged in an area inside the effective diameter of the optical recording medium so that a penetrated wave having a shape corresponding to aberration occurring in the area is formed, and applies predetermined voltage to a plurality of electrodes arranged in an area outside the effective diameter of the optical recording medium so that a penetrated wave not having a shape corresponding to aberration occurring in the area is formed.

2. An aberration correcting device which corrects an aberration occurring when an objective lens exclusively used for a first optical recording medium is employed for a second optical recording medium having an effective diameter in recording or reproducing the optical recording medium smaller than an effective diameter of the first optical recording medium, and for a third optical recording medium having an effective diameter smaller than an effective diameter of the second optical recording medium, comprising: a liquid crystal element disposed between the objective lens and a light source and controlled a refractive index thereof to be varied in accordance with an applied voltage; and a voltage applying portion for applying voltage to the liquid crystal element so that a wavefront of light penetrated through the liquid crystal element forms a penetrated wavefront having a predetermined phase distribution, wherein the voltage applying portion applies voltage so that a penetrated wavefront having a phase distribution for correcting only an aberration occurring in an area inside a first effective diameter in recording or reproducing the second optical recording medium is formed when the objective lens is employed for the second optical recording medium, and applies voltage so that a penetrated wavefront having a phase distribution for correcting only an aberration occurring in an area inside a second effective diameter in recording or reproducing the third optical recording medium is formed when the objective lens is employed for the third optical recording medium.

3. The aberration correcting device according to claim 2, wherein the voltage applying portion independently applies predetermined voltage to a first area corresponding to inside of the second effective diameter and a second area corresponding to outside of the second effective diameter and inside of the first effective diameter to variably control only amplitude of penetrated wavefronts formed in each area, in which the voltage applying portion applies predetermined voltage to the first area and the second area so that a penetrated wavefront having an amplitude corresponding to aberration occurring in each area is formed when the objective lens is employed for the second optical recording medium, and applies predetermined voltage to the first area so that a penetrated wavefront having an amplitude corresponding to aberration occurring in the first area is formed and applies predetermined voltage to the second area so that a penetrated wavefront not having an amplitude corresponding to aberration occurring in the second area is formed when the objective lens is employed for the third optical recording medium.

4. The aberration correcting device according to claim 3, wherein the voltage applying portion applies predetermined voltage to the first area so that a penetrated wavefront having a predetermined amplitude ratio to the penetrated wavefront formed in the first area when the objective lens is employed for the second optical recording medium is formed, and applies predetermined voltage to the second area so that a penetrated wavefront having an amplitude ratio different from the predetermined amplitude ratio when the objective lens is employed for the third optical recording medium.

5. The aberration correcting device according to claim 3, wherein the voltage applying portion respectively applies equal voltage to an outermost circumference of the first area and an innermost circumference of the second area when the objective lens is employed for the second optical recording medium.

6. The aberration correcting device according to claim 2, wherein the voltage applying portion independently applies predetermined voltage to a first area corresponding to inside of the second effective diameter and a second area corresponding to outside of the second effective diameter and inside of the first effective diameter to variably control only amplitude of penetrated wavefronts formed in each area, in which the voltage applying portion applies predetermined voltage to the second area alone so that a penetrated wavefront having an amplitude corresponding to aberration occurring in the second area is formed when the objective lens is employed for the second optical recording medium, and applies predetermined voltage to the first area alone so that a penetrated wavefront having an amplitude corresponding to aberration occurring in the first area is formed when the objective lens is employed for the third optical recording medium.

7. The aberration correcting device according to claim 6, wherein the voltage applying portion applies voltage of fixed value to each of the first area and the second area.

8. The aberration correcting device according to claim 2, wherein the voltage applying portion integrally applies predetermined voltage to a first area corresponding to inside of the second effective diameter and a second area corresponding to outside of the second effective diameter and inside of the first effective diameter to variably control integrally only amplitude of penetrated wavefronts formed in each area, in which the voltage applying portion integrally applies predetermined voltage to the first area and the second area so that a envelop surface of the penetrated wavefront has in the first area a amplitude corresponding to aberration occurring in the first area, and has in the second area a plurality of step differences having a depth of integral times of a wavelength used in recording or reproducing the second optical recording medium when the objective lens is employed for the second optical recording medium, and the voltage applying portion integrally applies predetermined voltage to the first area and the second area so that a envelop surface of the penetrated wavefront has in the first area a amplitude corresponding to aberration occurring in the first area, and has in the second area a plurality of step differences having a depth except integral times of a wavelength used in recording or reproducing the third optical recording medium when the objective lens is employed for the third optical recording medium.

9. The aberration correcting device according to claim 2, wherein the voltage applying portion independently applies predetermined voltage to a first area corresponding to inside of the second effective diameter and a second area corresponding to outside of the second effective diameter and inside of the first effective diameter to variably control only amplitude of penetrated wavefronts formed in each area, in which the voltage applying portion independently applies predetermined voltage to the first area and the second area so that a envelop surface of the penetrated wavefront has in the first area a amplitude corresponding to aberration occurring in the first area, and has in the second area a plurality of step differences having a depth of integral times of a wavelength used in recording or reproducing the second optical recording medium when the objective lens is employed for the second optical recording medium, and the voltage applying portion independently applies predetermined voltage to the first area and the second area so that to form a envelop surface of the penetrated wavefront has in the first area a amplitude corresponding to aberration occurring in the first area, and has in the second area a plurality of step differences having a depth except integral times of a wavelength used in recording or reproducing the third optical recording medium when the objective lens is employed for the third optical recording medium.

10. An optical recording medium reproducing device which corrects an aberration occurring when an objective lens exclusively used for a first optical recording medium is employed for a second optical recording medium having an effective diameter in recording or reproducing the optical recording medium smaller than an effective diameter of the first optical recording medium, and for a third optical recording medium having an effective diameter smaller than an effective diameter of the second optical recording medium, and reproduces information recorded in each optical recording media, comprising: a liquid crystal element disposed between the objective lens and a light source and controlled a refractive index thereof to be varied in accordance with an applied voltage; and a voltage applying portion for applying voltage to the liquid crystal element so that a wavefront of light penetrated through the liquid crystal element forms a penetrated wavefront having a predetermined phase distribution, wherein the voltage applying portion applies voltage so that a penetrated wavefront having a phase distribution for correcting only an aberration occurring in an area inside a first effective diameter in recording or reproducing the second optical recording medium is formed when the objective lens is employed for the second optical recording medium, and applies voltage so that a penetrated wavefront having a phase distribution for correcting only an aberration occurring in an area inside a second effective diameter in recording or reproducing the third optical recording medium is formed when the objective lens is employed for the third optical recording medium.

* * * * *